(12) United States Patent
Kaushik et al.

(10) Patent No.: US 11,722,437 B2
(45) Date of Patent: Aug. 8, 2023

(54) CONFIGURATION OF A SCALABLE IP NETWORK IMPLEMENTATION OF A SWITCH STACK

(71) Applicant: NetScout Systems, Inc, Westford, MA (US)

(72) Inventors: Koneru Kaushik, San Jose, CA (US); Sivakumar Thirunavukkarasu, San Jose, CA (US); Amal Khursheed, Delhi (IN); Pratapa Yeddula, Westford, MA (US); Saradha Srinivasan, Saratoga, CA (US)

(73) Assignee: NetScout Systems, Inc., Westford, MA (US)

( * ) Notice: Subject to any disclaimer, the term of this patent is extended or adjusted under 35 U.S.C. 154(b) by 85 days.

(21) Appl. No.: 17/475,103

(22) Filed: Sep. 14, 2021

(65) Prior Publication Data
US 2023/0082398 A1 Mar. 16, 2023

(51) Int. Cl.
*H04L 12/937* (2013.01)
*H04L 49/253* (2022.01)
*H04L 49/10* (2022.01)
*H04L 47/2483* (2022.01)
*H04L 49/354* (2022.01)
*H04L 12/46* (2006.01)

(52) U.S. Cl.
CPC ........ *H04L 49/253* (2013.01); *H04L 47/2483* (2013.01); *H04L 49/10* (2013.01); *H04L 49/354* (2013.01); *H04L 12/4633* (2013.01)

(58) Field of Classification Search
CPC ... H04L 49/253; H04L 47/2483; H04L 49/10; H04L 49/354; H04L 12/4633
See application file for complete search history.

(56) References Cited

U.S. PATENT DOCUMENTS

| | | | |
|---|---|---|---|
| 8,009,559 B1* | 8/2011 | Turk | H04L 63/1416 370/231 |
| 11,336,570 B1* | 5/2022 | K N | H04L 45/42 |
| 2005/0220014 A1* | 10/2005 | DelRegno | H04L 47/10 370/474 |
| 2005/0220148 A1* | 10/2005 | DelRegno | H04L 47/10 370/442 |
| 2006/0126616 A1* | 6/2006 | Bhatia | H04L 12/4645 370/465 |

(Continued)

*Primary Examiner* — Wutchung Chu
(74) *Attorney, Agent, or Firm* — Foley & Lardner LLP

(57) ABSTRACT

A method and system of configuring a stack of switches includes configuring a switch with mapping information based on a user input flow mapping that defines destination port(s) (local destination port(s) and/or remote destination port(s)) for a flow to exit the stack. The mapping information includes any local destination port(s) via which the flow can exit the stack from the switch and an outbound stack port for each of any remote destination port(s) via which the flow can be transmitted from the switch to a downstream switch. The method further includes creating a decapsulation entry having a flow ID for the flow, wherein the flow ID is assigned to the flow and is unique across the stack, and configuring the switch with access to a decapsulation algorithm configured to use the flow ID via the decapsulation entry to decapsulate encapsulated network traffic of the flow received from an upstream switch.

16 Claims, 14 Drawing Sheets

(56) References Cited

U.S. PATENT DOCUMENTS

| | | | |
|---|---|---|---|
| 2010/0095367 A1* | 4/2010 | Narayanaswamy | ........................ H04L 63/0245 726/12 |
| 2013/0194914 A1* | 8/2013 | Agarwal | ................. H04L 47/10 370/235 |
| 2013/0279503 A1* | 10/2013 | Chiabaut | ................. H04L 45/44 370/389 |
| 2013/0311675 A1* | 11/2013 | Kancherla | ............... H04L 69/22 709/244 |
| 2014/0219086 A1* | 8/2014 | Cantu' | .................... H04L 47/78 370/231 |
| 2015/0180769 A1* | 6/2015 | Wang | ..................... H04L 45/38 370/236 |
| 2017/0134309 A1* | 5/2017 | Sufleta | .................... H04L 49/30 |
| 2017/0195254 A1* | 7/2017 | Pham | ..................... H04L 41/40 |
| 2017/0214703 A1* | 7/2017 | Tekchandani | ....... H04L 63/1425 |
| 2017/0346731 A1* | 11/2017 | Pukhraj Jain | ........... H04L 45/38 |
| 2019/0124572 A1* | 4/2019 | Park | ..................... H04W 36/08 |
| 2019/0132221 A1* | 5/2019 | Boutros | ................. H04L 45/00 |
| 2019/0238363 A1* | 8/2019 | Boutros | ................ H04L 45/306 |
| 2021/0281577 A1* | 9/2021 | Sasaki | ................ H04L 63/0435 |
| 2022/0214919 A1* | 7/2022 | Hewson | ................. H04L 47/11 |
| 2022/0374379 A1* | 11/2022 | Galles | .................. H04L 45/745 |

* cited by examiner

Two Node Stack, Single Destination Using Map Creation and Encapsulation/Decapsulation

Two Nodes Stack : Traffic Flow Example

Two Nodes Stack with Multiple Destinations: Topology

Fig. 5  Two Nodes Stack with Multiple Destinations: Topology

Two Nodes Stack with Multiple Destinations: Traffic Flow Example

Three Nodes Stack: Topology

Three Nodes Stack Using Map Creation and Encapsulation/Decapsulation

CONFIGURATION OF A SCALABLE IP NETWORK IMPLEMENTATION OF A SWITCH STACK

BACKGROUND

1. Field of the Disclosure

The present disclosure relates to stack of switches, and more particularly, to a scalable IP network implementation of switch stack.

2. Description of Related Art

Some switches can connect to other switches and operate as a single device, these switches are called stackable switches. A stack is a network solution having two or more stackable switches working as a single device but with increased number of ports. A few examples of stacking software solutions currently available include vStack™, Broadcom™ (e.g., HIGIG™) and products by Cisco™.

While conventional methods and systems have generally been considered satisfactory for their intended purpose, there is still a need in the art for stacking software solutions that offer reduced resource consumption overhead per added switch, elimination of switch-to-switch hardwiring requirements, and the ability of provide availability of an increased number of stack ports in a stack.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method of configuring a stack having at least two switches. The method includes configuring a switch of the at least two switches with mapping information based on a user input flow mapping for a flow, wherein the flow mapping defines one or more destination ports having one or more local destination ports and/or one or more remote destination ports for the flow to exit the stack. The mapping information includes the one or more local destination ports, if any, via which the flow can exit the stack from the switch, and an outbound stack port for each of the one or more remote destination ports, if any, via which the flow can be transmitted from the switch to a downstream switch, if any. Configuring the switch further includes creating a decapsulation entry that corresponds to the flow, the decapsulation entry having an associated flow identification (ID) for the flow, wherein the flow ID is assigned to the flow and is unique across the stack. Configuring the switch further includes configuring the switch with access to a decapsulation algorithm, wherein the decapsulation algorithm is configured to use the flow ID via the decapsulation entry to decapsulate encapsulated network traffic of the flow received from an upstream switch of the at least two switches.

In one or more embodiments, the one or more destination ports can include one or more local destination ports, and the method can further include associating the one or more local destination ports with the decapsulation entry.

In one or more embodiments, the at least two switches further can include at least one downstream switch that is downstream from the switch, and the method further includes creating an encapsulation entry that corresponds to the flow and configuring the switch with access to an encapsulation algorithm. The encapsulation entry can have the flow ID for the flow. The encapsulation algorithm can be configured to use the flow ID via the encapsulation entry to encapsulate the decapsulated network traffic of the flow prior to the switch transmitting the encapsulated network traffic to the at least one downstream switch.

In one or more embodiments, the method further can include associating the encapsulation entry with the decapsulation entry.

In one or more embodiments, the at least two switches can include at least one downstream switch that is downstream from the switch. The method can further include providing the flow mapping and associated flow ID to the at least one downstream node for configuration of the at least one downstream node.

In one or more embodiments, configuring a second switch of the at least two switches as a head node of the stack for the flow can include configuring the second switch for receiving a flow definition and the flow mapping for the flow, wherein the flow definition can include a filter to apply to received network traffic so that only network traffic that satisfies the flow definition, based at least on the network traffic matching the filter, is assigned to the flow. Configuring the second switch as head node of the stack for the flow can further include obtaining the flow ID for the flow, associating the flow ID to the flow definition and the flow mapping of the flow, and storing the mapping information associated with the flow ID based on the flow's flow mapping, wherein the mapping information can indicate one or more outbound stack ports of the second switch for transmission of the flow through the stack ultimately to the one or more remote destination ports. Configuring the second switch as head node of the stack for the flow can further include creating a second encapsulation entry that corresponds to the flow, the second encapsulation entry having the flow ID for the flow, storing the second encapsulation entry in a high-speed memory in association with the flow definition, and accessing an encapsulation algorithm. The encapsulation algorithm can be configured to use the flow ID via the second encapsulation entry to encapsulate received network traffic of the flow prior to the second switch transmitting the encapsulated network traffic via the one or more outbound stack ports of the second switch.

In one or more embodiments, the method can further include storing the flow definition and the flow mapping in a high-speed memory, wherein the second encapsulation entry, the flow definition, and the flow mapping can be stored in association with one another, and wherein the mapping information can potentially further include one or more second local destination ports that are local to the second switch.

In one or more embodiments, the switch can include an inbound stack port via which the switch receives the encapsulated network traffic and the upstream switch includes an outbound stack port via which the upstream switch transmits the encapsulated network traffic, and wherein the method can further include assigning an internet protocol address to each of the inbound stack port and the outbound stack port.

In one or more embodiments, the encapsulated network traffic can be received from the upstream switch via a physical connection between an inbound stack port of the switch and an outbound stack port of the upstream switch.

In one or more embodiments, the encapsulated network traffic from the upstream switch can be received from two or more outbound stack ports via two or more inbound stack ports of the switch, wherein the two or more outbound stack ports can be configured as a load balance group and/or the two or more inbound stack ports are configured as a load balance group.

In accordance with an aspect of the disclosure, a stack having at least two switches for transmitting network traffic through the stack is provided. Each switch includes a memory configured to store instructions and a processor disposed in communication with the memory, wherein the processor associated with a switch of the at least two switches upon execution of the instructions is configured to configure a switch of the at least two switches with mapping information based on a user input flow mapping for a flow. The flow mapping defines one or more destination ports having one or more local destination ports and/or one or more remote destination ports for the flow to exit the stack. The mapping information includes the one or more local destination ports, if any, via which the flow can exit the stack from the switch, and an outbound stack port for each of the one or more remote destination ports, if any, via which the flow can be transmitted from the switch to a downstream switch, if any. The processor associated with the switch upon execution of the instructions is configured to create a decapsulation entry that corresponds to the flow and configure the switch with access to a decapsulation algorithm. The decapsulation entry has an associated flow identification (ID) for the flow, wherein the flow ID is assigned to the flow and is unique across the stack. The decapsulation algorithm is configured to use the flow ID via the decapsulation entry to decapsulate encapsulated network traffic of the flow received from an upstream switch of the at least two switches.

In one or more embodiments, the one or more destination ports can include one or more local destination ports, and the processor associated with the switch upon execution of the instructions can be further configured to associate the one or more local destination ports with the decapsulation entry.

In one or more embodiments, the at least two switches can further include at least one downstream switch that is downstream from the switch, wherein the processor associated with the switch upon execution of the instructions can be further configured to create an encapsulation entry that corresponds to the flow. The encapsulation entry can have the flow ID for the flow and the switch can be configured with access to an encapsulation algorithm, wherein the encapsulation algorithm can be configured to use the flow ID via the encapsulation entry to encapsulate the decapsulated network traffic of the flow prior to the switch transmitting the encapsulated network traffic to the at least one downstream switch.

In one or more embodiments, the processor associated with the switch upon execution of the instructions can be further configured to associate the encapsulation entry with the decapsulation entry.

In one or more embodiments, the at least two switches can include at least one downstream switch that is downstream from the switch, and the processor associated with the switch upon execution of the instructions can be further configured to provide the flow mapping and associated flow ID to the at least one downstream node for configuration of the at least one downstream node.

In one or more embodiments, a processor associated with a second switch of the at least two switches upon execution of the instructions can be configured to receive a flow definition and the flow mapping for the flow, wherein the flow definition includes a filter to apply to received network traffic so that only network traffic that satisfies the flow definition, based at least on the network traffic matching the filter, is assigned to the flow. The processor associated with the second switch of the at least two switches upon execution of the instructions can be configured to obtain the flow ID for the flow, associate the flow ID to the flow definition and the flow mapping of the flow, store the mapping information associated with the flow ID based on the flow's flow mapping, create a second encapsulation entry that corresponds to the flow, the second encapsulation entry having the flow ID for the flow, store the second encapsulation entry in a high-speed memory in association with the flow definition, and access an encapsulation algorithm. The mapping information can indicate one or more outbound stack ports of the second switch for transmission of the flow through the stack ultimately to the one or more remote destination ports. The encapsulation algorithm can be configured to use the flow ID via the second encapsulation entry to encapsulate received network traffic of the flow prior to the second switch transmitting the encapsulated network traffic via the one or more outbound stack ports of the second switch.

In one or more embodiments, the processor associated with the second switch upon execution of the instructions can be further configured to store the flow definition and the flow mapping in a high-speed memory, wherein the second encapsulation entry, the flow definition, and the flow mapping can be stored in association with one another, and wherein the mapping information can potentially further include one or more second local destination ports that are local to the second switch.

In one or more embodiments, the switch can include an inbound stack port via which the switch receives the encapsulated network traffic and the upstream switch can include an outbound stack port via which the upstream switch transmits the encapsulated network traffic, and wherein the processor associated with the switch upon execution of the instructions can be further configured to assign an internet protocol address to each of the inbound stack port and the outbound stack port.

In one or more embodiments, the encapsulated network traffic can be received from the upstream switch via a physical connection between an inbound stack port of the switch and an outbound stack port of the upstream switch.

In one or more embodiments, the encapsulated network traffic from the upstream switch can be received from two or more outbound stack ports via two or more inbound stack ports of the switch, wherein the two or more outbound stack ports can be configured as a load balance group and/or the two or more inbound stack ports can be configured as a load balance group.

In accordance with further aspects of the disclosure a non-transitory computer readable storage medium and one or more computer programs embedded therein is provided, which when executed by a computer system (e.g., a processing device of a switch of the stack), cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
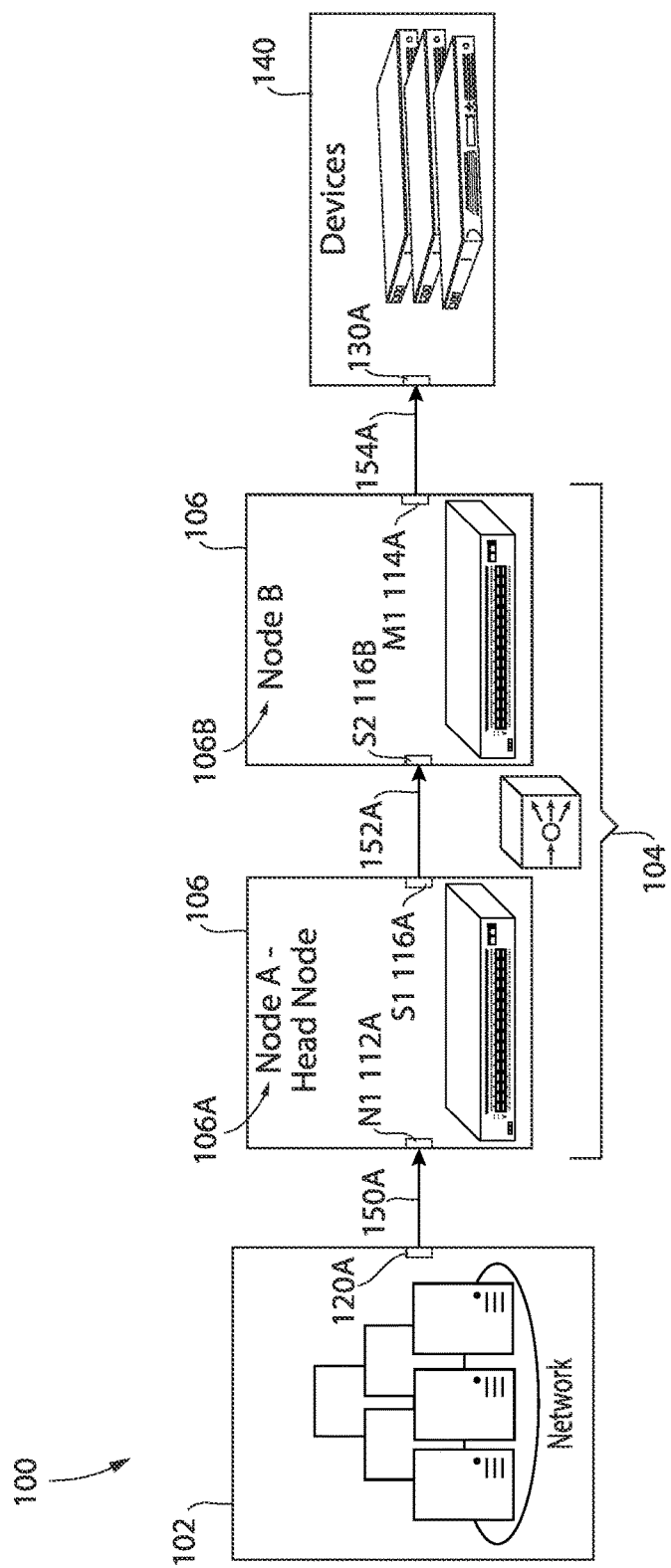
FIG. 1 shows an example network system with an example stack topology with two nodes and a single destination port, in accordance with aspects of the disclosure.

The systems and methods described herein can be used to provide a scalable stack of switches configured in a mesh to enable delivery of a flow to multiple destination ports.

Switches are connected to each other physically or over internet protocol (IP) network. Ports used to connect two switches are referred to as stack ports. Once switches are connected to form a stack, the stack behaves as a single unit. A switch that receives network traffic into the stack is referred to as a head node, a switch that transmits network traffic out of the stack is referred to as a destination node. A port which receives traffic into the stack is referred to as a source port. A port which transmits traffic out of the stack is referred to as a destination port. In one or more embodiments, the network traffic is assigned to the flow only once before arriving at the at least one destination port.

The destination ports for a flow can include one or more remote destination ports and optionally one or more local destination ports. A remote destination port is reached by the flow traversing at least one additional switch in the stack. A local destination port is physically connected to the same switch that received the flow from the source. The destination port(s) can be one or more ports of one or more devices. The device(s) can each be a monitoring tool (without limitation to monitoring tools) and can be local or remote. Local refers to the device being coupled by only physically connections to the source. Remote refers to the device being coupled by at least one datalink that uses IP (referred to as an IP datalink), wherein the IP datalink provides data communication between two switches of the stack.

Each flow is defined by a flow definition, for example and without limitation, a unique pair of (source port, packet match criteria). A flow definition can include a set of user configurable rules or a tuple that identifies aggregated traffic streams. The rules can be applied to packet information associated with the network traffic. Furthermore, each flow is identified using a unique flow identifier that is unique across the stack of switches. The unique flow identifier can be referred to as a tunnel identifier (TID).

The stack port of each switch used to send network traffic through the stack is assigned an IP address. Ports connecting two switches over the IP network create an IP datalink.

During a configuration stage, a switch of the stack is configured to identify network traffic that belongs to a flow (e.g., based on source port and packet match criteria), assign a unique TID to the flow, designate one or more destination ports to the flow, and create a map specifying the one or more destination ports (local (if any) and remote) via which the flow will exit the stack. This switch acts as head node for the flow. In addition, the head node is configured to encapsulate the traffic using the flow's TID before sending the flow to a next switch of the stack. The head node is configured to use the map to route the flow to the next switch of the stack using a stack protocol, which includes configuring the switch with mapping information for the flow to exit the stack via its local ports (if any) of its one or more destination ports and flow towards remote ports of its one or more destination ports. A stack protocol or manual process is used to determine a route for the flow through the stack to exit the stack at each of its destination ports. In each instance described below for which configuration is describes as being performed using a stacking protocol, it is also possible that the configuration can be performed manually. The route from the head node to the destination port(s) can include an IP data link. In one or more embodiments, network traffic is assigned to a flow only once before arriving at the at least one destination port.

In addition, each other switches of the stack to which the flow is to be routed based on the map are configured to decapsulate network traffic belonging to the flow using the TID and to route the flow to any destination ports designated for the flow that are physically connected to the switch, if any. Furthermore, if the map indicates that the flow should be routed through the stack to additional destination ports, the switch is configured to encapsulate the network traffic belonging to the flow using the TID and to route the encapsulated network traffic to a next switch of the stack in accordance with the map and a stack protocol.

Accordingly, only the head node is configured to assign network traffic to a flow. Each of the other switches of the stack to which the flow is to be routed based on the map do not need to assign the network traffic to a flow. Rather, such switches are configured to have the ability to only decapsulate network traffic that belongs to the flow, so that all other network traffic will be ignored.

Each switch of the stack can act as head node for one or more flows. Similarly, each switch of the stack can act as transit or destination nodes for one or more flows. The role of a switch in a stack is relative to the flow and applies to that flow. For a flow, its head node is the switch that receives network traffic into the stack from an external source, its destination node is each switch that transmits network traffic out of the stack to an external device, and transit nodes, if any are the switches that transmit network traffic from one switch to another within the stack.

During an operation stage in which network traffic flows through the stack, the head node assigns network traffic to a flow based on a flow definition. A head node can assign (also referred to as a filter) network traffic into more than one flow using a first flow definition for the first flow and a second flow definition for the second flow. Once network traffic is identified as belonging to a flow, it is assigned the unique TID for the flow. The network traffic is encapsulated using the flow's TID and delivered through the stack to the flow's one or more destination ports using a stack protocol.

Each flow is routed through the stack based on a map for the flow. Each switch along the route is configured with the map and with the flow's TID for decapsulating network traffic belonging to the flow and encapsulating the network traffic before sending the flow to a next switch along the route via a stack protocol.

Each decapsulation and encapsulation is performed using the flow's TID. Network traffic that belong to a flow is decapsulated using the flow's TID and sent to any local destination ports of each switch it traverses. If the map requires the flow to be sent via a stack port to another switch, the flow's network traffic is encapsulated again using flow's TID before being sent via the stack port. Network traffic having a different flow ID that that does not match the flow's TID is ignored by the switch. In this way, the network traffic is decapsulated at every switch it traverses, and encapsulated again before continuing along the route.

The network traffic is only assigned to a flow once, which occurs at the head node. Flow assignment, including identification of a new flow, is performed only at the head node, such as by using, for example and without limitation, a high-speed memory, such as ternary content-addressable memory (TCAM) or virtual forwarding instance (VFI), and a unique TID is assigned to the flow. Once a flow exits a switch functioning as a head node, no further filtering of a flow is performed. The flow is identified using its unique TID at other switches that receive the flow along a mapped route to the flow's one or more destination ports.

Each flow is first encapsulated at the head node of the stack using the unique TID assigned to the flow. The flow is routed through the stack using a routing algorithm that finds a shortest path from the switch that function as the head node to one or more switches that function as a destination node of the flow, from which the flow is delivered via a physical connection to its destination port(s).

Reference will now be made to the drawings wherein like reference numerals identify similar structural features or aspects of the subject disclosure. For purposes of explanation and illustration, and not limitation, a block diagram of an exemplary embodiment of a network system 100 having a stack of switches in accordance with the disclosure is shown in FIG. 1 and is designated generally by reference character 100. Methods associated with monitoring operations associated with a protected network of the network system 100 in accordance with the disclosure, or aspects thereof, are provided in FIGS. 2-10, as will be described.

Figure 4:
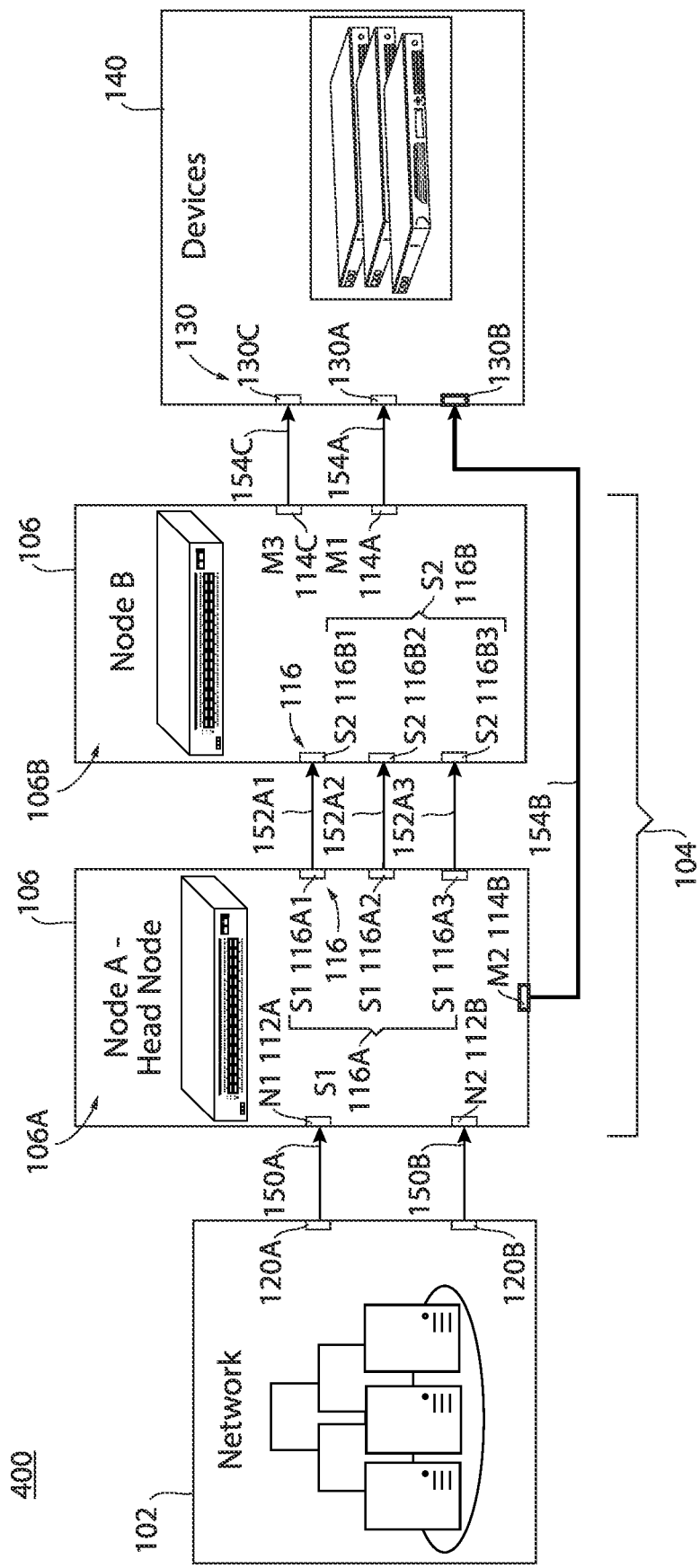
FIG. 4 shows an example network system with an example stack topology with two nodes and multiple destination ports, in accordance with aspects of the disclosure.
Figure 7:
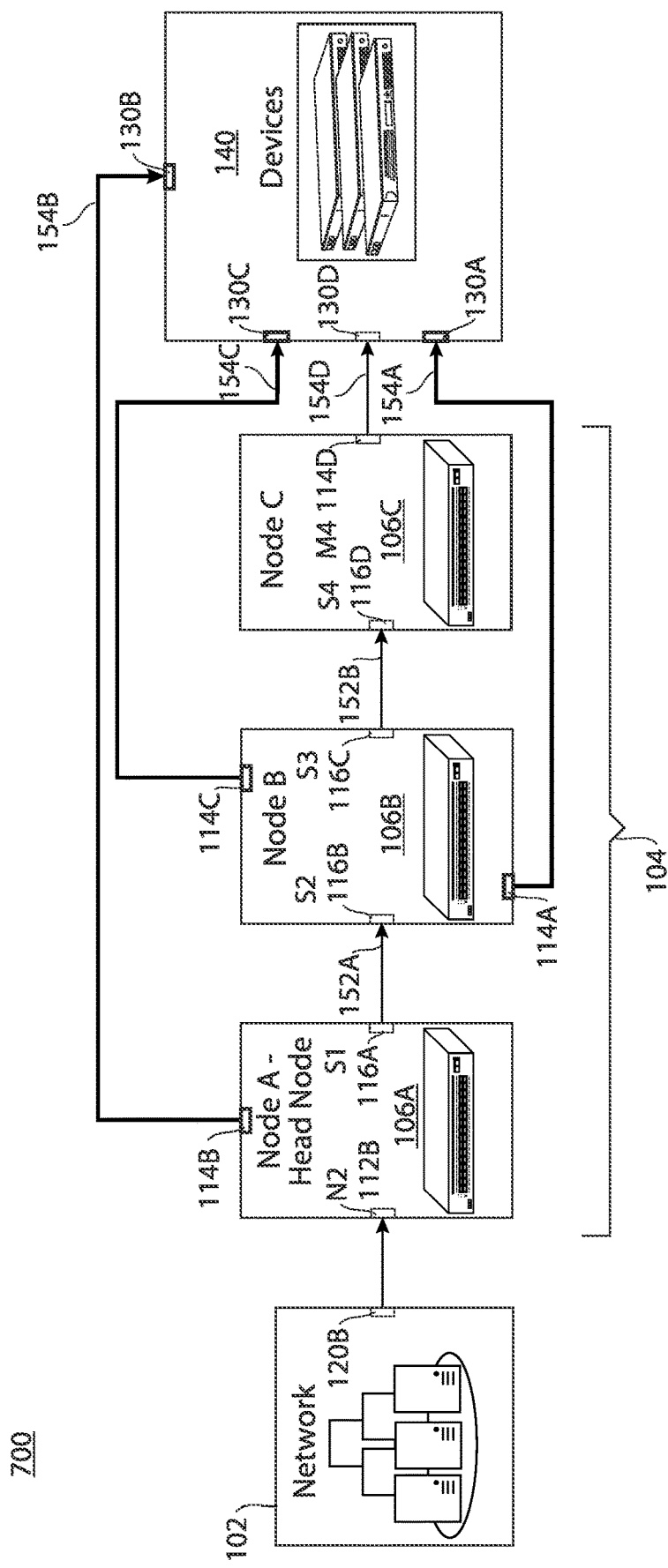
FIG. 7 shows an example network system with an example stack topology with three nodes and multiple destination ports, in accordance with aspects of the disclosure.

With reference now to FIGS. 1, 4, and 7, network system 100 includes a network 102, a stack 104, and one or more devices 140. FIGS. 1, 4, and 7 are shown for illustration purposes only, and stack 104 can include any number of switches. FIG. 1 shows a simple embodiment with one destination port 114, referred to generally by reference numeral 114, that is coupled to a device port, referred to generally by reference numeral 130 of one or more devices 140. FIGS. 4 and 7 show multiple destination ports 114. The head node of stack 104 is not limited to a particular number of source ports 112 that are connected to any number of external networks or devices 102. Furthermore, stack 104 can have any number of destination ports 114 and be connected to any number of device ports 130. FIGS. 1 and 4 show network system 100 with stack 104 configured to have a stack topology with two nodes, and FIG. 7 shows network system 100 with stack 104 configured to have a stack topology with three nodes.

Network 102, can include one or more networks, such as an intranet, a local area network (LAN), a virtual private network (VPN), and/or a wide area network (WAN). In examples, network 102 can be a private network, such as a network that is monitored and/or protected by devices 140. For example, network 102 can be an enterprise network, such as a school network, business network, and government network, to list a few examples. In one or more examples network 102 can include a public internet, such as the Internet.

Stack 104 includes two or more switches, referred to collectively as switches, referred to generally by reference numeral 106, and shown as example switches 106A, 106B, and 106C. Switches 106 are stackable switches, such as, for example and without limitation to a specific switch, NETSCOUT nGenius packet flow switch (PFS) of NetScout™ Systems, Inc. of Westford, Mass. Switches 106 are configured in a stack based on a stack topology, such as, without limitation to a particular topology, a point-to-point, star, ring, tree, bus, or daisy chain topology, or a hybrid of one or more topologies. Each stack includes at least two nodes, including a head node and a destination node, as well as possible transit nodes.

One of switches 106 can function as a head for a specific flow. Other switches 106 can function as one or more destination nodes and optionally one or more transit nodes. A switch 106 functioning as a head node includes one or more source ports 112 for receiving network traffic from external network 102 via a hardwired network datalink, referred to generally by reference numeral 150. The switch 106 functioning as the head node (also referred to as the head node) is configured to receive network traffic from an external port of network 102, wherein the external port is referred to generally by reference 120. The head node if further configured to recognize a flow in the network traffic, and assign the recognized network traffic to the flow, wherein the flow has been assigned a unique TID. A switch 106 that functions as a transit node (also referred to as a transit node) is configured to be traversed by the flow before the flow reaches its destination port. A switch 106 that functions as a destination node (also referred to as a destination node) is physically connected to device port(s) 130 of device(s) 140. For different flows, different switches 106 can be configured to function as the head node, transit node, and destination node.

During a pre-configuration process, the switches 106 are configured into a stack, a unique identity (switch ID) is assigned to each switch 106, and a unique IP address is assigned to each stack port, referred to generally by reference numeral 116, of each switch 106 that is connected to another switch 106. The pre-configuration process can be performed (before configuring the switches to handle flows) by a central administrative device or can be performed in a distributed fashion.

One example process for assigning the IP addresses to stack ports can include detecting neighboring switches 106, identifying the switches 106, and for each switch 106 identified, assigning a unique IP address to each port based on the switch's 106 switch ID. This process can be performed automatically without human intervention. Another example process for assigning IP addresses includes a user manually designating an IP address per port from an available pool of IP addresses.

During the configuration process, (see block 204 in FIG. 2), a user configures one or more of switches 106 as a head node, which includes configuring each head node with one or more flow definitions and configuring a general flow mapping from the head node's source port(s), referred to generally by reference numeral 112, to destination port(s), referred to generally by reference numeral 114, that physically connect to destination ports of the associated flow.

Examples of a flow definition are (source port or packet match criteria) or (source port and packet match criteria). The packet match criteria are user configurable. Examples of packet match criteria include, without limitation, association of a packet of network traffic to a virtual large area network (Vlan), a source or destination IP address, a source or destination media access control (MAC) address, and/or expected bits a specified position or offset in a packet.

In an example using Vlan for packet match criteria, packets associated with a Vlan 100 can be assigned to a first flow and packets associated with a Vlan 200 can be assigned to a second flow. Packets that are not associated with Vlan 100 or 200 are dropped.

A head node can be configured to assign network traffic from port 120A associated with a first Vlan that matches the packet matching criteria of a first flow and network traffic from port 120A associated with a second Vlan that matches the packet matching criteria of a second flow. Packets of the network traffic that do not match any flow definitions are dropped at the head node and are not assigned to any flow.

The flow mapping specifies one or more destination ports, referred to generally by reference numeral 114, that are physically connected to one or more ports of one or more devices to which the corresponding flow is to be directed. For example, the first flow can be directed through the stack to one or more first destination ports 114 of stack 104, and the second flow can be directed through the stack to one or more second destination ports 114 of stack 104. The first and second destination ports 114 can be physically connected to the same or different ports of the same device(s) and/or different device(s).

Figure 2:
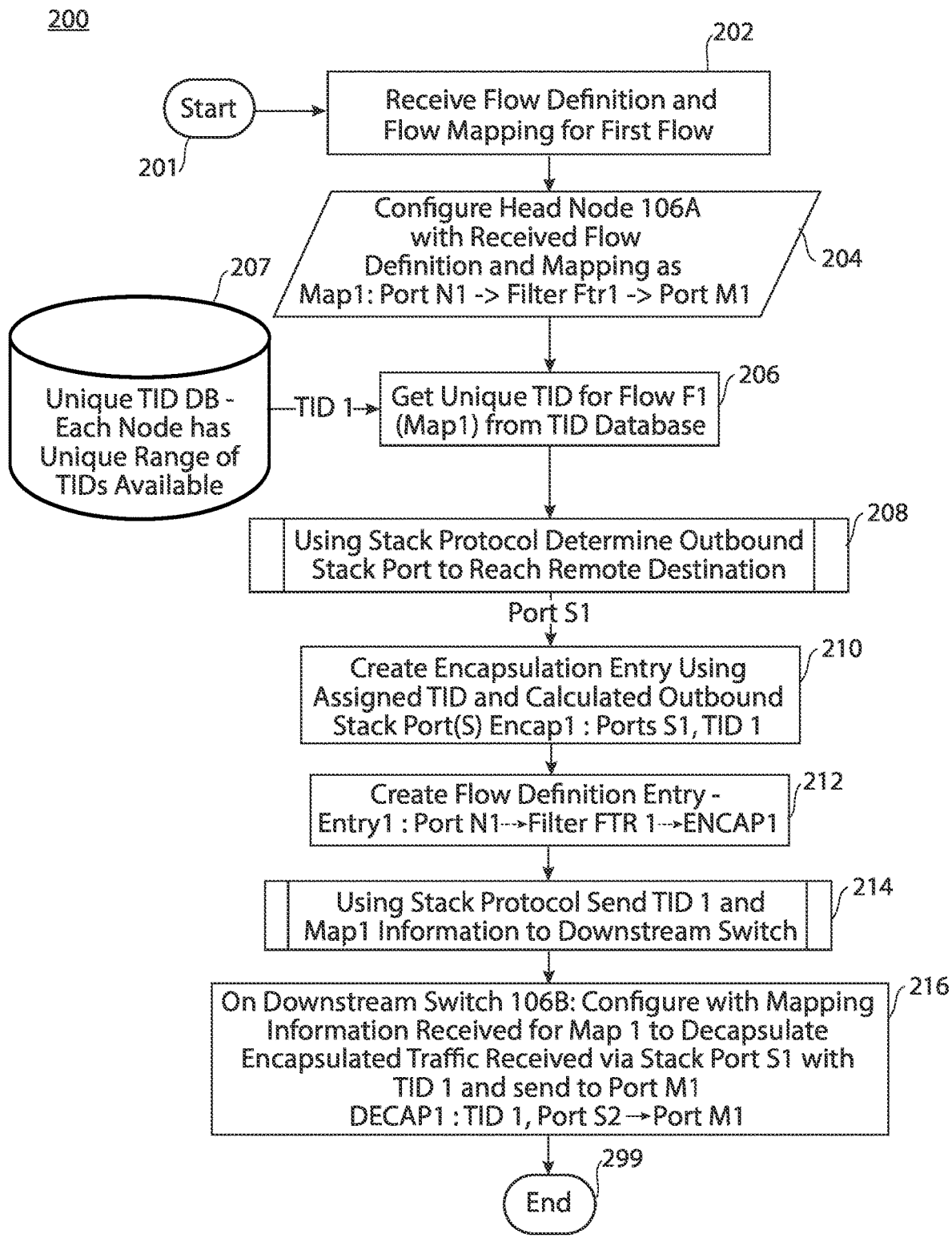
FIG. 2 shows a flowchart of an example method of configuring a stack having the topology shown in FIG. 1, in accordance with aspects of the disclosure.

Once flow definitions and flow mappings are configured by a user, the head node assigns a unique TID to each flow (see block 206 of FIG. 2). Each switch 106 that is configured as a head node has a unique pool of candidate TIDs (see block 207 of FIG. 2) that it can use to assign to flows. One example method for guaranteeing uniqueness of TIDs across the stack 104 is modifying (e.g., without limitation, appending to, incrementing) the head node's switch ID with one of its candidate TIDs.

Once the TID is assigned, any stacking protocol, such as vStack™, is used for determining a route through the stack 104 for each flow to reach its destination port(s). The stack protocol can use different factors for determining the route for the flow, such as (without limitation) number of hops, load on switches, distance traversed by hop, etc. For example, the route can be generated to be the shortest path from the head node to the destination node using a shortest-route algorithm, for example Dijkstra's algorithm, without any limitation to a particular algorithm. Determining the route includes determining the stack port for each hop along the route.

The head node then creates an encapsulation entry for each respective flow definition using the corresponding assigned TID and identification (e.g., IP address) of the head node's stack port 116 (see block 210 of FIG. 2). These encapsulation entries are associated in a high-speed memory (for example, TCAM or VFI or the like) with the corresponding flow definition, (see block 212 of FIG. 2). These encapsulation entries ensure that when network traffic is received via source port 112 that matches one of the flow definitions, the network traffic is encapsulated based on the flow's assigned TID and output from the head node via stack port 116 as determined by the stacking protocol.

The stack protocol communicates the assigned TID and destination ports to each switch 106 included in the route assigned to the flow, including one or more destination switches 106 and optionally one or more transit switches 106 (see block 214 of FIG. 2). For each flow, the stack protocol further configures the stack 104 by creating decapsulation and encapsulation entries to be used by each switch 106 included along the flow's route. A decapsulation entry (see block 218 of FIG. 2) is created on each downstream node based on the assigned TID and destination port identification received via stack protocol for one or more destination ports. When encapsulated traffic with the assigned TID is received on a destination node via stack port 116, this decapsulation entry decapsulates the network traffic using the assigned TID and sends the decapsulated network traffic to appropriate destination port(s) 114.

In addition to decapsulation entry, an encapsulation entry is also provided for each downstream transit node (see block 818 of FIG. 8) based on the assigned TID, and the next hop's stack port identification received via stack protocol. When encapsulated traffic with the assigned TID is received on a transit node via stack port 116, the associated decapsulation entry decapsulates the network traffic using the assigned TID and sends the decapsulated network traffic to appropriate destination port(s) 114, if any. The decapsulated network traffic is again encapsulated on a transit node using an associated encapsulation entry to encapsulate the network traffic using the assigned TID and send the encapsulated network traffic to a next downstream switch where it is decapsulated and sent to local destination port(s) 114, if any, and/or to one or more further downstream switches via stack port 116. During the operation stage when the stack 104 receives live network traffic, a switch 106 that receives network traffic at an entry port 112 from the external network 102, examines each packet of the network traffic to determine whether the packet should be assigned to a flow. If the packet satisfies one of the flow definitions with which the switch 106 has been configured, then switch 106 functions as a head node for the flow and assigns the packet to the corresponding flow. Otherwise, the switch 106 drops the packet. Dropping the packet can include ignoring the packet without storing the packet or transmitting the packet to another switch or destination port.

At the head node, once network traffic is assigned to a flow, the network traffic is encapsulated based on an associated encapsulation entry that was created during the configuration stage. The encapsulation entry encapsulates the network traffic using the flow's TID and sends the encapsulated network traffic from its stack port 116 to a downstream switch 106 in stack 104.

The downstream switch 106 receiving the flow via the stack 104 is now the current switch 106. The switch 106 decapsulates the flow using the decapsulation entry that was created during the configuration stage. The decapsulation entry decapsulates the encapsulated network traffic using the flow's TID. For transit nodes, in which the flow still has at least one more hop within stack 104, switch 106 encapsulates the network traffic before transmission to the next downstream switch 106 (upon which it will again be decapsulated by the receiving downstream switch 106).

An example method of encapsulation and decapsulation of the network traffic using the TID is Layer-2 generic routing encapsulation protocol (L2GRE). Other examples methods include Virtual Extensible large area network (LAN) (VXLAN) and Virtual Private LAN Service (VPLS). Encapsulation and decapsulation of the flows based on the unique TID assigned to each flow obviates the need to filter the network traffic at each receiving switch 106. Thus, filtering of the traffic can be performed only at the head node. The traffic filtering process requires additional hardware, such as high-speed memory (e.g., TCAM). Thus each switch 106 that is not a head node, meaning it does not have a physical connection to the network 102, does not perform traffic filtering and does not require hardware and software used for traffic filtering. The hardware and processing costs associated with encapsulation and decapsulation are less expensive than the hardware and software needed for traffic filtering, and therefore cost is reduced in terms of hardware and processing.

Each switch 106 that functions as a destination node includes one or more destination ports 114 for transmitting network traffic to external device(s) 140 via a hardwired device datalink, referred to generally by reference numeral 154. Head and/or transit nodes 106 can optionally include one or more exit ports 114, such as exit ports 114A—114E that connect to device(s) 140 via a device datalink 154, as shown in FIG. 7. When a stack includes three or more nodes, each switch 106, whether a head, transit, or tail node, includes at least one stack port 116 between switches 106 for receiving or transmitting traffic via stack datalinks, referred to generally by reference numeral 152.

Switch 106A, which is shown in FIGS. 1, 4, and 7 as the head node, includes one or more network ports, for example ports 112A and/or 112B (referred to collectively as source port 112), which are configured to receive traffic via network datalink 150 from with network 102. In FIG. 1, a first example flow F1 originates from an external port 120A of network 102 in FIG. 1. In FIG. 4, a second example flow F2 originates from external port 120B of network 102. In FIG. 7, a third example flow F3 originates from external port 120B of network 102. The first flow F1 traverses hardwired network datalinks 150 from external port 120A of network 102 to the source port N1 112A on head node 106A.

Switch 106B is shown as the destination node in FIGS. 1, 4 and 7 for the first flow F1, second flow F2 and third flow F3, switch 106A is shown as the destination node in FIGS. 4 and 7 for second flow F2 and third flow F3, and switch 106C is shown as the destination node in FIG. 7 for the third flow F3. Destination ports 114A and/or 114C of destination node 106B are configured to transmit traffic via device datalink 154 to device ports 130A, and 130C of device(s) 140 in FIGS. 1 and 4, destination port 114B of destination node 106A is configured to transmit traffic via device datalink 154 to device ports 130B of device(s) 140 in FIG. 4, and destination port 114C of destination node 106C is configured to transmit traffic via device datalink 154 to device ports 130D of device(s) 140 in FIG. 7.

In FIG. 1, a first flow F1 from source port N1 112A and satisfying first packet match criteria is assigned a first TID, TID 1, and its destination port is designated as destination port M1 114A. Stack 104 is configured so that flow F1 exits stack 104 at destination port 114A (provided in switch 106B) for transmission to device port 130A.

In FIG. 4, a second flow F2 from source port N2 112B and satisfying second packet match criteria is assigned a second TID, TID 2, and its destination port is designated as destination ports M1 114A, M2 114B, and M3 114C. Stack 104 is configured so that flow F2 exits stack 104 at destination ports 114A, 114B, and 114C (provided in switches 106B, 106A, and 106B, respectively) for transmission to respective device ports 130A, 130B, and 130C.

In FIG. 7, a third flow F3 from source port N2 112B and satisfying third packet match criteria is assigned a third TID, TID 3, and its destination port is designated as destination ports M1 114A, M2 114B, and M4 114D. Stack 104 is configured so that flow F3 exits stack 104 at destination ports 114A, 114B, and 114D (provided in switches 106B, 106A, and 106C, respectively) for transmission to respective device ports 130A, 130B, and 130D. Flows F1, F2, and F3 traverse stack 104 by traversing stack datalinks 152. In FIGS. 1, 4, and 7 the flows F1, F2, and F3 flow via outbound stack port S1 116A of switch 106A to inbound stack port S2 116B of switch 106B via a first stack datalink L1 152A. In FIG. 7, flow F3 flows via outbound stack port S3 116C of switch 106B to inbound stack port S4 116D of switch 106C via a second stack datalink L2 152B.

Stack datalinks L1 152A and L2 152B, referred to collectively as stack datalink 152, can be physical datalinks and/or datalinks that connect over internet protocol (IP) (referred to as IP datalinks). Each stack datalink 152 can optionally include two or more sub-stack datalinks between the same two nodes. Sub-stack datalinks, such as sub-stack datalinks 152A1, 152A2, and 152A3 are shown in FIG. 4, without limitation to a particular number of sub-stack datalinks. Sub-stack datalinks 152A1, 152A2, and 152A3 can be of the same or different types, such as physical links or links over IP. When there are more than one sub-stack datalinks 152A1, 152A2, and 152A3 (physical or over IP) between two switches 106, sub-stack datalinks 152A1, 152A2, and 152A3 are treated as a trunk and traffic is load-balanced amongst sub-stack datalinks 152A1, 152A2, and 152A3.

Traditional stacked switches require physical connection between switches. vStack™ by NetScout™ Systems, Inc. of Westford, Mass. provides a self-organizing stack architecture. vStack/pStack provides a packet broker or PFS switch in a network system connected to another packet broker or PFS switch also in the network system, that is connected to a monitoring tool(s). However, although this enables multiple hops through the network and remote monitoring by the monitoring tool, constraints limit the number of network ports that can be used in this configuration. A further limitation is application of filtering at each hop, requiring appropriate resources at each hop, using high-speed memory, such as TCAM. TCAM is a type of content-addressable memory (CAM) that can be relatively expensive.

These limitations are overcome by assigning a unique TID to each flow and applying encapsulation and decapsulation for hops between switches 106. Switches 106 have stack ports 116 that can connect to other switches 106 of stack 104 via switch datalinks 152, each stack port has an IP address. Switches 106 can be remote from one another, meaning communication between switches uses IP protocol. Switch datalinks 152 can use IP protocol, completely or partially, and are not constrained to using physical connections.

Second, providing IP addresses to each stack port 116 and unique TIDs to respective flows helps to enable scalability of stack 104 without limiting stack architecture or the stacking protocol to a particular number of source ports 112, stack links 152, or destination ports 114.

Third, application of encapsulation and decapsulation for hops between switches based on unique TIDs per flow enables traffic filtering to be performed at the head node only. Traffic filtering at the transit nodes and destination nodes is not needed.

Hosts of network 102 that transmit traffic to stack 104, switches 106, and device's 140 each include a central processing unit (CPU), random access memory (RAM), and a storage medium, which can be connected through buses and used to further support the processing of the received packets. Programmable instructions can be stored in the storage medium and executed by the CPU to cause the CPU to perform operations described herein. Hosts of network 102 and device(s) 140 can be implemented as physical or virtual devices. Whether implemented as physical or virtual device(s), hosts of network 102 and device(s) 140 use one or more local or remote hardware processing devices that executes software instructions, which enables performance of the disclosed functions.

With reference now to FIGS. 2, 3, 5, 6, 8, 9, 10A, 10B, 11A, and 11B, the flowcharts and flow diagrams shown demonstrate implementations of various exemplary embodiments. It is noted that the order of operations shown in FIGS. 2, 3, 5, 6, 8, 9, 10A, 10B, 11A, and 11B is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

Figure 3:
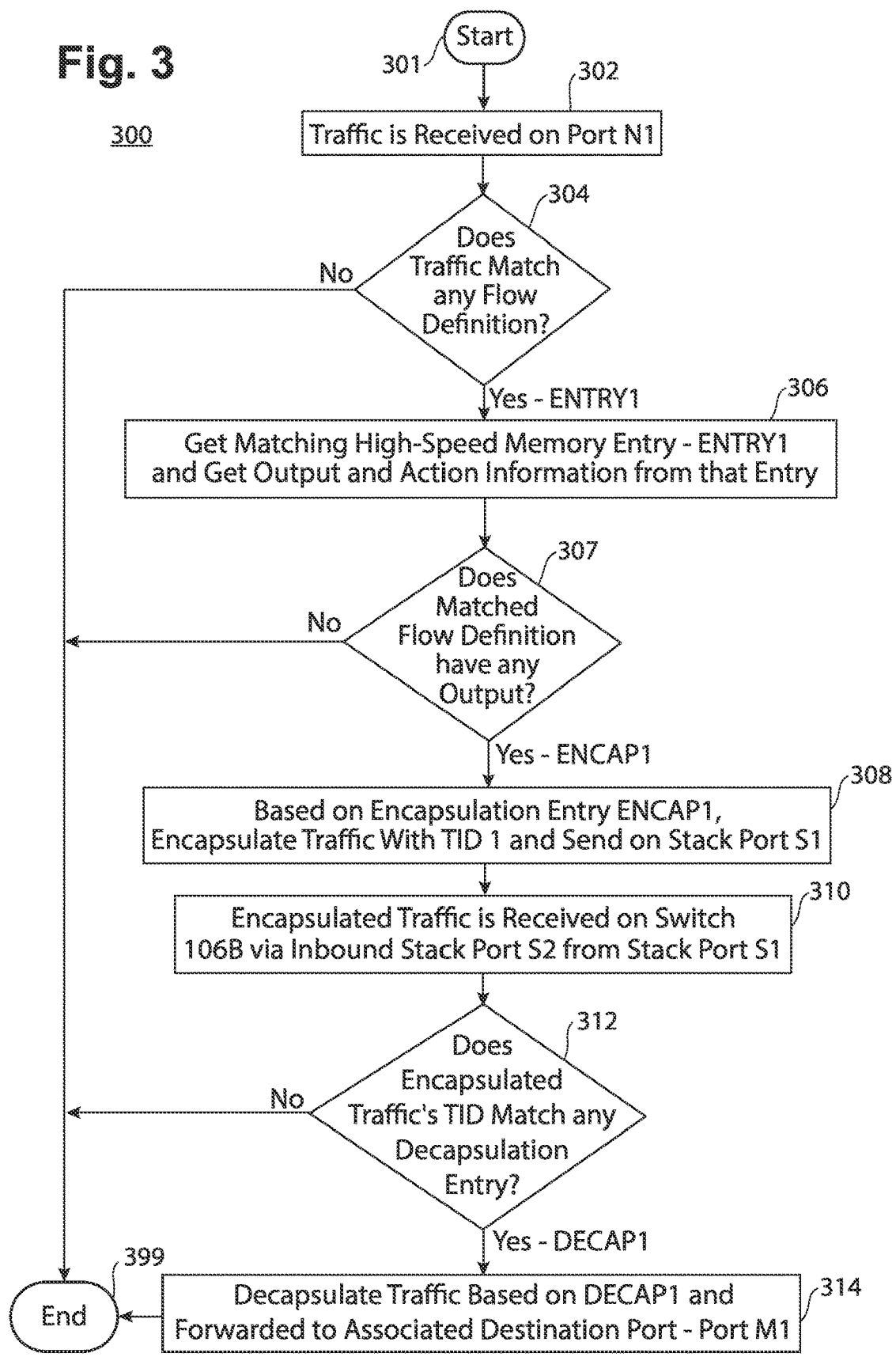
FIG. 3 shows an example traffic flow diagram of the flow of traffic during the operational stage of a stack configured in FIG. 2 having the topology shown in FIG. 1, in accordance with aspects of the disclosure.

FIG. 1 shows a two-node stack topology with one source port 112A and one destination port 114A. FIG. 2 shows a flowchart 200 which shows how stack 104 is configured based on the topology shown in FIG. 1. FIG. 3 shows a flowchart 300 which shows how network traffic will flow across stack 104 shown in FIG. 1 once configured as shown in FIG. 2.

Flowchart 200 shown in FIG. 2 shows a method for configuring a stack, such as stack 104 having two switches, e.g., switches 106A and 106B and one destination port 114A, as shown in FIG. 1. The method starts at block 201. At block 202, a flow definition and flow mapping are received from a user and stored. For example, the flow definition for flow F1 specifies a source port for the flow and packet match criteria. In this example, the source port is source port N1 112A and the packet match criteria are provided as a filter FTR1. The flow is formed of network traffic that satisfies the flow definition, determined at least by selecting network traffic that matches filter FTR1. The flow mapping defines one or more destination ports (e.g., destination ports 114 shown in FIG. 1) via which the network traffic associated with the flow will exit the stack. In this example the destination port is destination port M1 114A. The flow definition and flow mapping received from the user at block 202 are used to configure the stack to achieve an outcome desired by the user. In this example, the outcome would be all network traffic from source port 112A that matches filter FTR1 (meaning it satisfied criteria specified by the filter) is routed from source port 112A to destination port 114A.

At block 204, head node (in this example, switch 106A) is configured with a map (also referred to as the flow's map), based on the received flow definition and flow mapping, which defines flow F1. In this example, the map is expressed as: Map1: N1→FTR1→M1, wherein N1 refers to source port N1 112A and M1 refers to destination port M1 114A. Map1 defines flow F1 and configures the head node so that network traffic received at source port N1 112A that matches filter FTR1 of Map1 is sent to destination port M1 114A.

Switch 106A maintains a TID database 207 for unique TIDs. At block 206, switch 106A accesses TID database 207 to reserve a unique TID for flow F1, as defined by Map1. This TID is unique across stack 104 and is assigned to flow F1. In the example shown, the TID assigned to F1 and Map1 is TID 1.

A stack protocol or manual process can be used to configure each switch of the stack with mapping information for a flow based on the flow mapping. Each switch's mapping information is associated with the TID assigned to the flow associated with the mapping information. The mapping information informs the switch with identification of ports used for directing the network traffic through the switch. For example, the mapping information can identify local destination ports of a switch from which the associated network traffic exits the stack, an outbound stack port of the switch from which the associated network traffic is transmitted to a downstream switch, and/or an inbound stack port of the switch from which the associated network traffic is received from an upstream switch.

In this example, at block 208, the head node (switch 106A) is configured manually or via stack protocol with mapping information that specifies outbound stack port S1 116A via which network traffic associated with flow F1 is sent to downstream switch 106B. Using stack protocol (or manually), determine outbound stack port to reach remote destination. The outbound stack port(s) are determined (using stack protocol or manually) to reach remote destinations, based on the flow mapping received. In this example, there is one remote destination, namely destination port M1 114A.

At block 210, switch 106A creates an encapsulation entry, in this example ENCAP1. Creation of an encapsulation entry for a flow for a switch refers to configuring the switch to encapsulate a packet using the flow's associated TID and calculated outbound stack port, and sending the packet to port designated for the flow by the stack protocol. In this example, encapsulation entry ENCAP1 is created to encapsulate packets based on the flow's TID (in this example, TID 1) and send the packet to the outbound stack port 116 of switch 106A from which the network traffic exits switch 106A (in this example stack port S1 116A).

The flow's TID therefore can be used to access the encapsulation entry and its mapping information. The encapsulation entry in association with the mapping information is expressed as ENCAP1: Port S1, TID 1.

At block 212, switch 106 stores the encapsulation entry ENCAP1 in an entry (ENTRY1) of a high-speed memory (e.g., TCAM) in association with the flow's definition. In this example, flow F1's definition includes flow F1's source port N1 112A and filter FTR1. This high-speed memory entry represents that all network traffic from source port N1 112A that matches filter FTR1 is assigned to encapsulation entry ENCAP1, which expresses the mapping information. The encapsulation entry ENCAP1 is used to assign a TID (in this example, TID 1) to the matched network traffic, encapsulate matched network traffic with the TID (in this example, TID 1) and send the encapsulated matched network traffic to each local stack port, in this case S1 116A. The mapping information is used to send the matched network traffic to each local destination port (if any) of the head node. In this example, no local destination ports are present on the head node switch 106A. In the current example, the high-speed memory entry is expressed as ENTRY1: Port N1→Filter FTR1→ENCAP1. The configuration process for the head node ends at block 299.

At block 214, the stack protocol is used to send a configuration to a downstream switch that is the next node on the route established for the flow by the stack protocol. The configuration can be based on the flow's map (in this example, Map1) that defines the flow, including the remaining destination ports by which the network traffic will exit the stack and the flow's TID. This flow's map is associated with TID 1 (as determined in block 206) and identifies remaining destination port(s) M1 114A as configured by the user in blocks 202 and 204. In this example, there is only one destination port and no further downstream nodes associated with Map1, hence the configuration is limited to the single destination port.

At block 216, the downstream switch, which is the next (second (and last)) node along the route defined by Map1 and determined by the stack protocol (in this example, switch 106B), is configured with the mapping information received for Map1 to decapsulate encapsulated traffic received via an inbound stack port (in this example S2 116B) with TID 1 and to send the decapsulated traffic to its local destination port(s), if any.

In this example, a decapsulation entry is created for flow F1 that can be used by a decapsulation algorithm to decapsulate network traffic matching flow F1 before sending it to the downstream switch's local destination ports defined by the mapping information, which in this example is destination port M1 114A. The decapsulation entry includes the flow F1's TID 1 identification, inbound stack port S2 116B from which network traffic matching flow F1 and having TID 1 is received, and identification of any local destination ports of the downstream switch, expressed as "DECAP1: TID 1, Port S2→Port M1," which means network traffic received at stack port S2 116B encapsulated with TID 1 is to be decapsulated using TID 1 and sent to destination port M1 114A.

A result is that the downstream switch is configured with mapping information and the flow's TID. The mapping information specifies inbound stack port S2 116B via which encapsulated network traffic matching flow F1 and having TID 1 is received from upstream switch 106A and local destination port M1 114A via which network traffic matching flow F1 exits stack 104. In this case, downstream switch 106B is the destination node for flow F1 and is not configured to send flow network traffic matching flow F1 to any further downstream switches.

The method ends at block 299, and this concludes implementation of the user configuration received in blocks 202 and 204 across stack 104.

FIG. 3 shows a traffic flow diagram 300 of network traffic flow during the operational stage in a stack that has already been configured for flow F1 to flow through two switches (106A and 106B) to one destination port (destination port M1 114A).

The method starts at block 301. At block 302, network traffic is received at the source port, (in this example source port 112A of switch 106A) that is physically connected to an external network (in this example, via port 120A). The switch (in this example, switch 106A) receiving the network traffic has been configured as the head node for flow F1. At block 304, a determination is made whether the network traffic matches any flow definitions (including associated filters) of any high-speed memory entries stored by the head node (e.g., switch 106A).

If the determination at block 304 is NO, that is the network traffic does not match any flow definitions of the high-speed memory entries, the method ends at block 399. Else, if the determination at block 304 is YES, that is the network traffic does match a flow definition of one of the high-speed memory entries, the method continues at block 306.

At block 306, the high-speed memory entry having the matching flow definition (including its filter (in this example, FTR1)) is selected. This selected traffic becomes a flow, which in this example is flow F1. It is noted, as described with respect to block 212 of FIG. 2, the selected high-speed memory entry is associated with the flow's encapsulation entry (in this example, ENCAP1). Output and/or action information can be obtained from the selected high-speed memory entry. In this example, the output and/or action information includes mapping information and the flow's encapsulation entry ENCAP1.

At block 307, a determination is made whether action and output information (meaning an encapsulation entry and mapping information) were successfully obtained at block 306. If action and output information were not available to be obtained, the method ends at block 399. If the action and output information were successfully obtained, the method continues at block 308.

At block 308, the network traffic is encapsulated based on encapsulation entry ENCAP1 using TID associated with the encapsulation entry, in this case TID 1 and sent to the stack port associated with the encapsulation entry, in this case to outbound stack port S1 116A as configured in block 210.

At block 310, the encapsulated network traffic assigned to the flow (also referred to as "the flow") is received at the downstream switch in the stack associated with the next hop via an inbound stack port. In this example, the flow F1 is received at switch 106B via stack port S2 116B, as shown in FIG. 1. The downstream switch that received the encapsulated network traffic (in this example switch 106B) becomes the current switch.

At block 312, a determination is made by the current switch whether the received network traffic's TID matches a TID included with any of the decapsulation entries created for the current switch (in this example switch 106B) during configuration described in flowchart 200 of FIG. 2. If it is determined at block 312 that the flow's TID matches a decapsulation entry, the method continues at block 314, else the method ends at block 399, meaning the network traffic is ignored. In this case network traffic's TID 1 matches decapsulation entry DECAP1.

At block 314, the current switch retrieves the mapping information associated with the decapsulation entry that was successful (as stored at block 216 of FIG. 2). The TID and mapping information can be used for future encapsulation and transmission of the flow to further downstream switches and local destination ports, if any. In this case, the flow's network traffic is decapsulated and forwarded to the next port based on the mapping information associated with DECAP1. As shown in FIG. 1 and block 216 of FIG. 2, a next port based on DECAP1 is M1 114A of switch 106B. Encapsulated network traffic received via stack port S2 116B is decapsulated based on DECAP1 and sent out of switch 106B from port M1 114A (determined from DECAP1). Decapsulated network traffic is received on device port 130A via datalink 154A.

This concludes stack configuration and network traffic flow across the stack for a two-node stack topology with one source port and one destination port as shown in FIG. 1.

Figure 5:
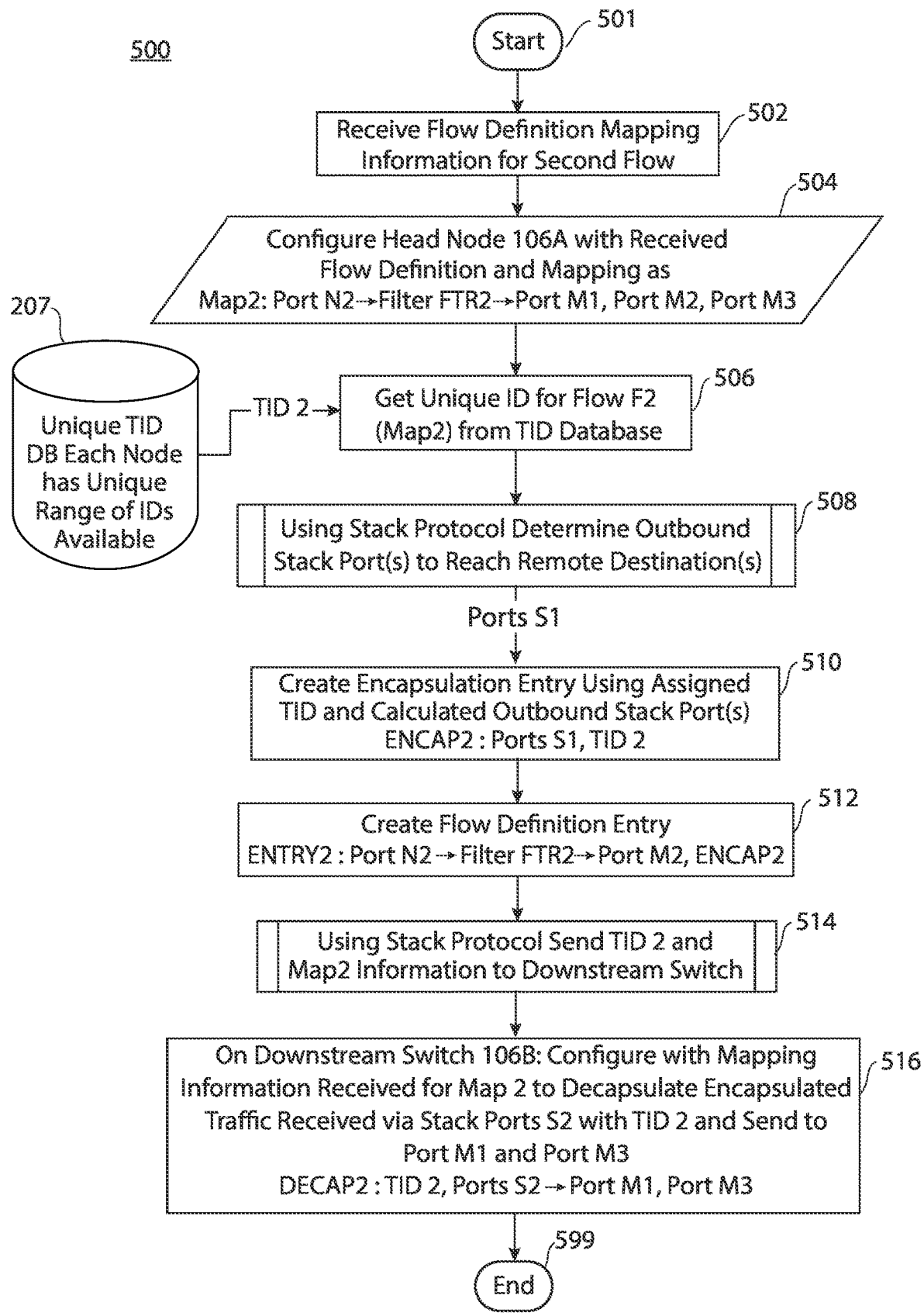
FIG. 5 shows a flowchart of an example method of configuring a stack having the topology shown in FIG. 4, in accordance with aspects of the disclosure.
Figure 6:
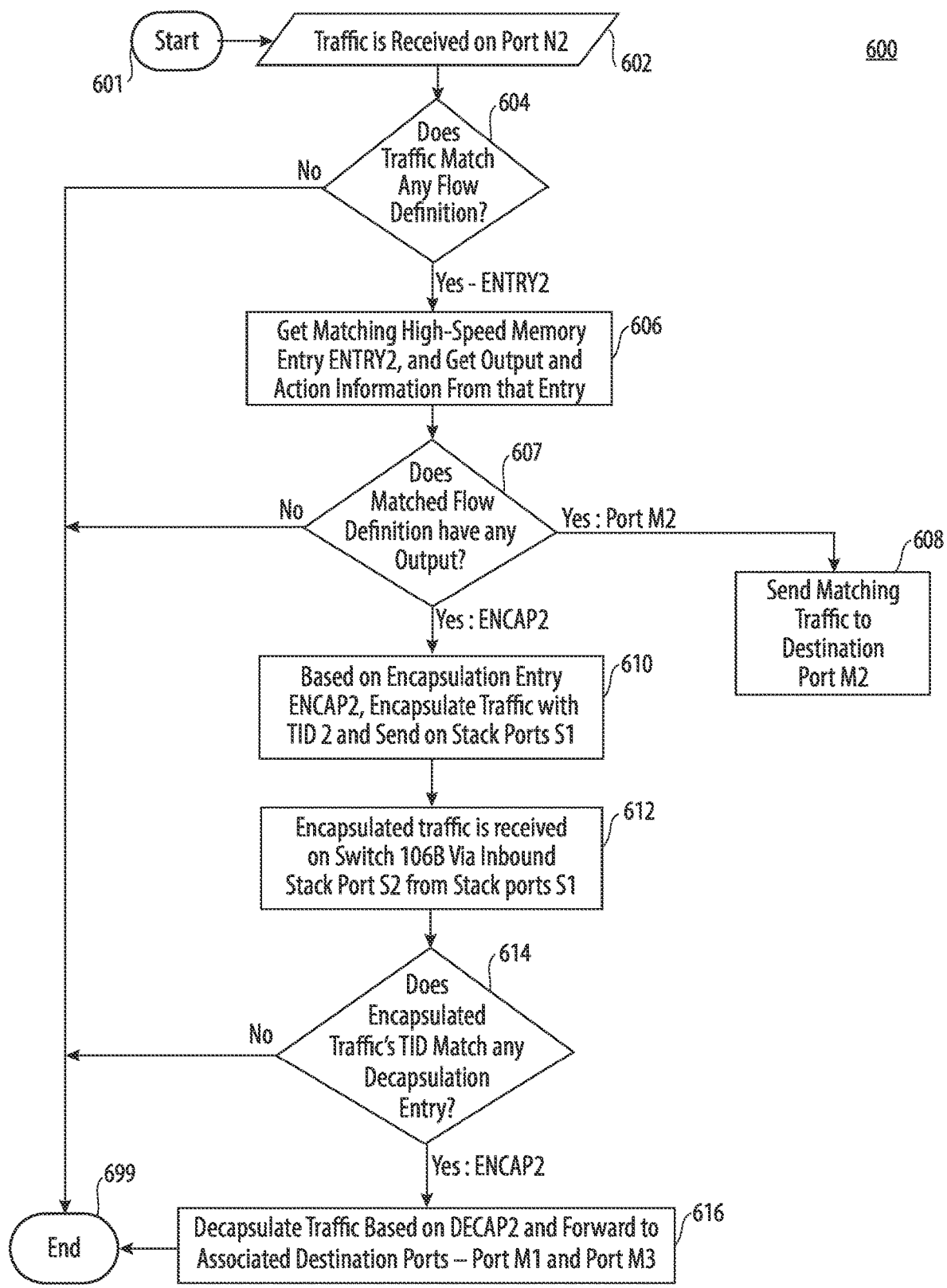
FIG. 6 shows an example traffic flow diagram of the flow of traffic during the operational stage of a stack configured in FIG. 5 having the topology shown in FIG. 4, in accordance with aspects of the disclosure.

FIG. 4 shows a two-node stack topology with multiple source ports N1 112A, N2 112B and multiple destination ports M1 114A, M2 114B, M3 114C. FIG. 5 shows a flowchart 500 which shows how stack 104 is configured based on the topology shown in FIG. 4. FIG. 6 shows a flowchart 600 which shows how network traffic will flow across stack 104 shown in FIG. 4 once configures as shown in FIG. 5. FIG. 4 augments FIG. 1 by adding a source port N2 112B and destination ports M2 114B and M3 114C. FIG. 4, FIG. 5, and FIG. 6 augment FIG. 1, FIG. 2 and FIG. 3, respectively, to depict how in a two-node stack topology, flow configuration and network traffic flow would operate when a flow has multiple destinations, both on a head node and on a destination node.

Flowchart 500 shown in FIG. 5 shows a method for configuring a stack, such as stack 104, having two switches, e.g., switches 106A and 106B with multiple destination ports, as shown in FIG. 4. An example is provided that corresponds to the topology 400 shown in FIG. 4, wherein stack 104 includes switches 106A and 106B and the destination ports include destination ports M1 114A, M2 114B, and M3 114C.

The method starts at block 501. At block 502, a flow definition and flow mapping are received from a user and stored. For example, the flow definition for flow F2 specifies a source port for the flow and packet match criteria. In this example, the source port is source port N2 112B and the packet match criteria are provided as a filter FTR2. The flow is formed of network traffic that satisfies the flow definition, determined at least by selecting network traffic that matches filter FTR2. The flow mapping defines one or more destination ports (e.g., destination ports 114 shown in FIG. 4) via which the network traffic associated with the flow will exit the stack. In this example the destination ports are destination ports M1 114A, M2 114B, and M3 114C. The flow definition and flow mapping received from the user at block 502 are used to configure the stack to achieve an outcome desired by the user. In this example, the outcome would be all network traffic from source port 112B that matches filter FTR2 (meaning it satisfied criteria specified by the filter) is routed from source port 112B to destination ports M1 114A, M2 114B, and M3 114C.

At block 504, head node (in this example, switch 106A) is configured with a map (also referred to as the flow's map), based on the received flow definition and flow mapping, which defines flow F2. In this example, the map is expressed as: Map2: Port N2→Filter FTR2→Port M1, Port M2, Port M3, wherein N2 refers to source port N2 112B and M1 refers to destination port M1 114A, M2 refers to destination port M2 114B, and M3 refers to destination port M3 114C. Map2 defines flow F2 and configures the head node so that network traffic received at source port N2 112B that matches filter FTR2 of Map2 is sent to destination ports M1 114A, M2 114B, and M3 114C.

Switch 106A maintains a TID database 207 for unique TIDs. At block 506, switch 106A accesses TID database 207 to reserve a unique TID for flow F2, as defined by Map2. This TID is unique across stack 104 and is assigned to flow F2. In the example shown, the TID assigned to F2 and Map2 is TID 2.

In this example, at block 508, the head node (switch 106A) is configured manually or via stack protocol with mapping information that specifies outbound stack ports S1 116A. The outbound stack port(s) are determined (using stack protocol or manually) to reach remote destinations, based on the flow mapping received. In this example, there are multiple remote destinations, namely destination ports 114A, 114B, and 114C.

If there are multiple stack ports between two switches, as in this case, a load balance group of stack ports can be configured. The load balance group of stack ports can be configured using the stack protocol or manually. The load balance group of stack ports is used in an encapsulation entry instead of an individual stack port. In this case, a load balance group of stack ports S1 116A is created across stack ports S1 116A1, S1 116A2, and S1 116A3 (also referred to as stack ports S1 116A). The load balance group of stack ports S1 116A can be used in the encapsulation entry ENCAP2 rather than one or more individual stack ports. The network traffic associated with flow F2 is sent to downstream switch 106B via stack ports S1 116A.

A load balance group of stack ports can be managed by a load balancing algorithm that balances network traffic that exits or enters a switch via a stack port of a load balanced group. The load balancing software can select inbound or outbound switches of a load balanced group based on load balancing factors, such as based on capacity of a data link 154 connected to the stack port, capacity of the stack port, current or expected network traffic load on the data link or stack port, status of the stack port or data link, etc.

At block 510, switch 106A creates an encapsulation entry, in this example ENCAP2. Creation of an encapsulation entry for a flow for a switch refers to configuring the switch to encapsulate a packet using the flow's associated TID and sending the packet to port designated for the flow by the stack protocol. In this example, encapsulation entry ENCAP2 is created to encapsulate packets based on the flow's TID (in this example, TID 2) and send the packet to the outbound stack ports 116 of switch 106A from which the network traffic exits switch 106A (in this example stack ports S1 116A).

The flow's TID therefore can be used to access the encapsulation entry and its mapping information. The encapsulation entry in association with the mapping information is expressed as ENCAP2: Ports S1, TID 2.

At block 512, switch 106 stores the encapsulation entry ENCAP2 in an entry (ENTRY2) of the high-speed memory (e.g., TCAM) in association with the flow's definition. In this example, flow F2's definition includes flow F2's source port N2 112B and filter FTR2. This high-speed memory entry represents that all network traffic from source port N2 112B that matches filter FTR2 is assigned to encapsulation entry ENCAP2, which expresses the mapping information.

The encapsulation entry ENCAP2 is used to assign a TID (in this example, TID 2) to the matched network traffic, encapsulate matched network traffic with the TID (in this example, TID 2) and send the encapsulated matched network traffic to each stack port, in this case the stack ports S1 116A. The mapping information is used to send the matched network traffic to each local destination port (if any) of the head node. In this example, local destination port M2 114B is present on the head node switch 106A. In the current example, the high-speed memory entry is expressed as ENTRY2: Port N2→Filter FTR2→ENCAP2. The configuration process for the head node ends at block 599.

At block 514, the stack protocol is used to send a configuration to a downstream switch that is the next node on the route established for the flow by the stack protocol. The configuration can be based on the flow's map (in this example, Map2) that defines the flow, including the remaining destination ports by which the network traffic will exit the stack and the flow's TID. This flow's map is associated with TID 2 (as determined in block 506) and identifies remaining destination port(s) M1 114A, and M3 114C as configured by the user in blocks 502 and 504. In this example, there are two destination ports on this switch and no further downstream nodes associated with Map2, hence the configuration is limited to the these destination ports.

At block 516, the downstream switch, which is the next (second (and last)) node along the route defined by Map2 and determined by the stack protocol (in this example, switch 106B), is configured by creating a decapsulation entry for flow F2 that can be used by a decapsulation algorithm to decapsulate network traffic matching flow F2 before sending it to the downstream switch's local destination ports defined by the mapping information, which in this example is destination ports M1 114A and M3 114C. The decapsulation entry includes the flow F2's TID 2 identification, inbound stack ports (in this case, a load balance group of stack ports S2 116B (including S2 116B1, S2 116B2, S2 116B3), also referred to as stack ports S2 116B) from which network traffic matching flow F2 and having TID 2 is received, and identification of any local destination ports of the downstream switch. The decapsulation entry is expressed as "DECAP2: TID 2, Ports S2→Port M1, M3" which means network traffic received at stack ports S2 116B encapsulated with TID 2 is to be decapsulated using TID 2 and sent to destination ports M1 114A and M3 114C.

A result is that the downstream switch is configured with mapping information and the flow's TID. The mapping information specifies the load balance group of inbound stack ports S2 116B via which encapsulated network traffic matching flow F2 and having TID 2 is received from upstream switch 106A and local destination port M1 114A and M3 114C via which network traffic matching flow F2 exits stack 104. In this case, downstream switch 106B is the destination node for flow F2 and is not configured to send flow network traffic matching flow F2 to any further downstream switches.

The method ends at block 599, and this concludes implementation of the user configuration received in blocks 502 and 504 across stack 104.

FIG. 6 shows a traffic flow diagram 600 of network traffic flow during the operational stage in a stack that has already been configured for flow F2 to flow through two switches (106A and 106B) to multiple destination ports (destination ports M1 114A, M2 114B, and M3 114C).

The method starts at block 601. At block 602, network traffic is received at the source port, (in this example source port 112B of switch 106A) that is physically connected to an external network (in this example, via port 120B). The switch (in this example, switch 106A) receiving the network traffic has been configured as the head node for flow F2. At block 604, a determination is made whether the network traffic matches any flow definitions (including associated filters) of any high-speed memory entries stored by the head node (e.g., switch 106A).

If the determination at block 604 is NO, that is the network traffic does not match any flow definitions of the high-speed memory entries, the method ends at block 699. Else, if the determination at block 604 is YES, that is the network traffic does match a flow definition of one of the high-speed memory entries, the method continues at block 606.

At block 606, the high-speed memory entry having the matching flow definition (including its filter (in this example, FTR2)) is selected. This selected traffic becomes a flow, which in this example is flow F3. It is noted, as described with respect to block 512 of FIG. 5, the selected high-speed memory entry is associated with the flow's encapsulation entry (in this example, ENCAP2). Output and/or action information can be obtained from the selected high-speed memory entry. In this example, the output and/or action information includes mapping information and the flow's encapsulation entry ENCAP2.

At block 607, a determination is made whether action and output information (meaning an encapsulation entry and mapping information) were successfully obtained at block 606. If action and output information were not available to be obtained, the method ends at block 699. If the action and output information were successfully obtained, the method continues at block 608.

At block 608, the flow's network traffic is forwarded to any of the switch's local destination port. In this example, the switch has a local destination port M2 114B and the flow's network traffic is forwarded to destination port M2 114B. Network traffic is received on device port 130B via datalink 154B.

At block 610, the network traffic is encapsulated based on encapsulation entry ENCAP2 using TID associated with the encapsulation entry, in this case TID 2 and sent to the stack port or load balance group of multiple stack ports associated with the encapsulation entry, in this case to load balance group of outbound stack ports S1 116A (which includes outbound stack ports S1 116A1, S1 116A2, S1 116A3) as configured in block 510.

At block 612, the encapsulated network traffic assigned to the flow (also referred to as "the flow") is received at the downstream switch in the stack associated with the next hop via an inbound stack port or load balance group of multiple stack ports. In this example, the flow F2 is received at switch 106B via load balance group of inbound stack ports S2 116B (which includes inbound stack ports S2 116B1, S2 116B2, S2 11B3, as shown in FIG. 4. The downstream switch that received the encapsulated network traffic (in this example switch 106B) becomes the current switch.

At block 614, a determination is made by the current switch whether the received network traffic's TID matches a TID included with any of the decapsulation entries created for the current switch (in this example switch 106B) during configuration described in flowchart 500 of FIG. 5. If it is determined at block 4 that the flow's TID matches a decapsulation entry, the method continues at block 616, else the method ends at block 699, meaning the network traffic is ignored. In this case network traffic's TID 2 matches decapsulation entry DECAP2.

At block 616, the current switch retrieves the mapping information associated with the decapsulation entry that was successful (as stored at block 516 of FIG. 5). The TID and mapping information can be used for future encapsulation and transmission of the flow to further downstream switches and local destination ports, if any. In this case, the flow's network traffic is decapsulated and forwarded to the next port based on the mapping information associated with DECAP2. As shown in FIG. 4 and block 516 of FIG. 5, next ports based on DECAP2 are M1 114A and M3 114C of switch 106B. Encapsulated network traffic received via stack ports S2 116B is decapsulated based on DECAP2 and sent out of switch 106B from port M1 114A and M3 114C (determined from DECAP2). Decapsulated network traffic is received on device ports 130A and 130C via datalinks 154A and 154C, respectively.

This concludes stack configuration and network traffic flow across the stack for a two-node stack topology with one source port and one destination port as shown in FIG. 1.

Figure 8:
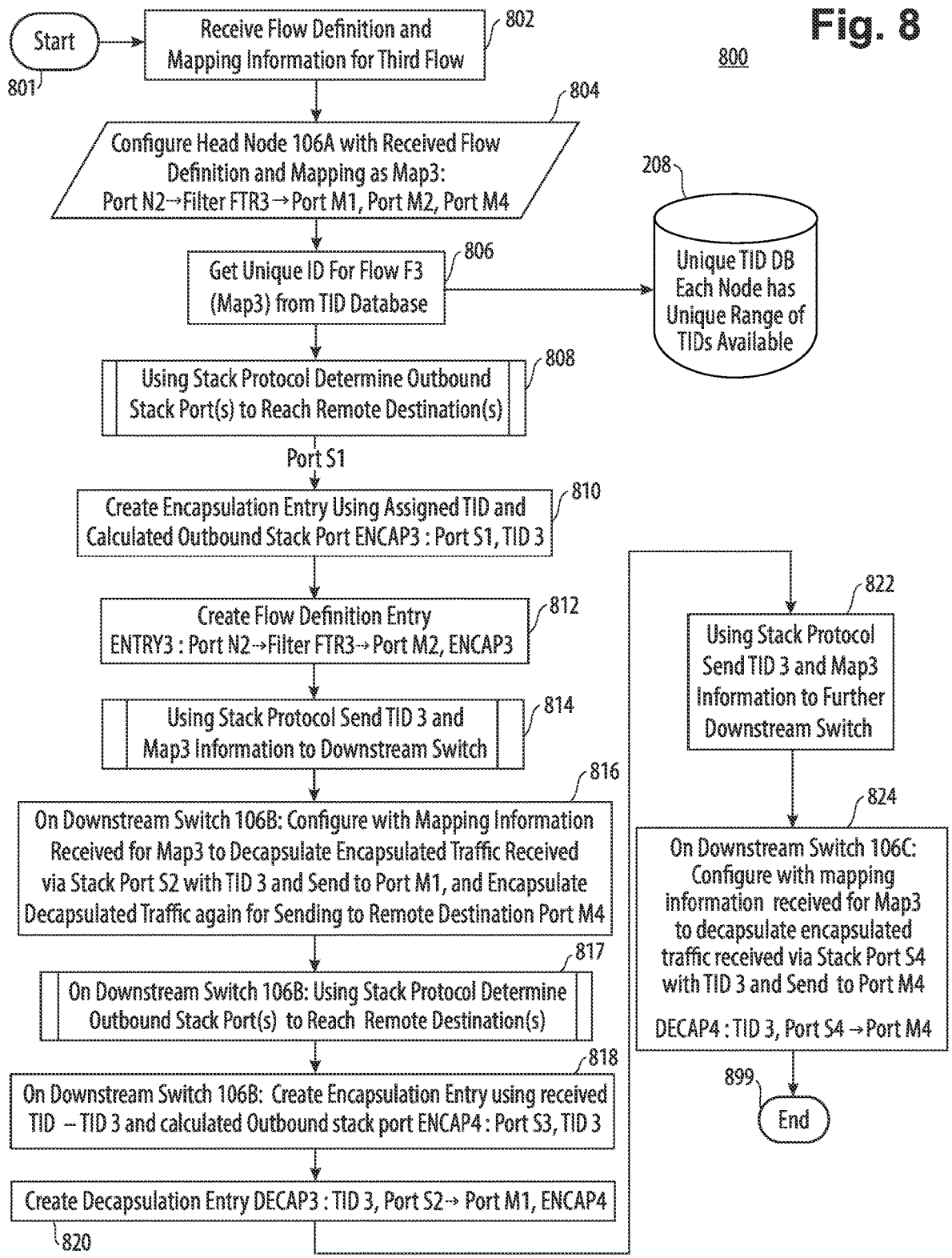
FIG. 8 shows a flowchart of an example method of c configuring a stack having the topology shown in FIG. 7, in accordance with aspects of the disclosure.
Figure 9:
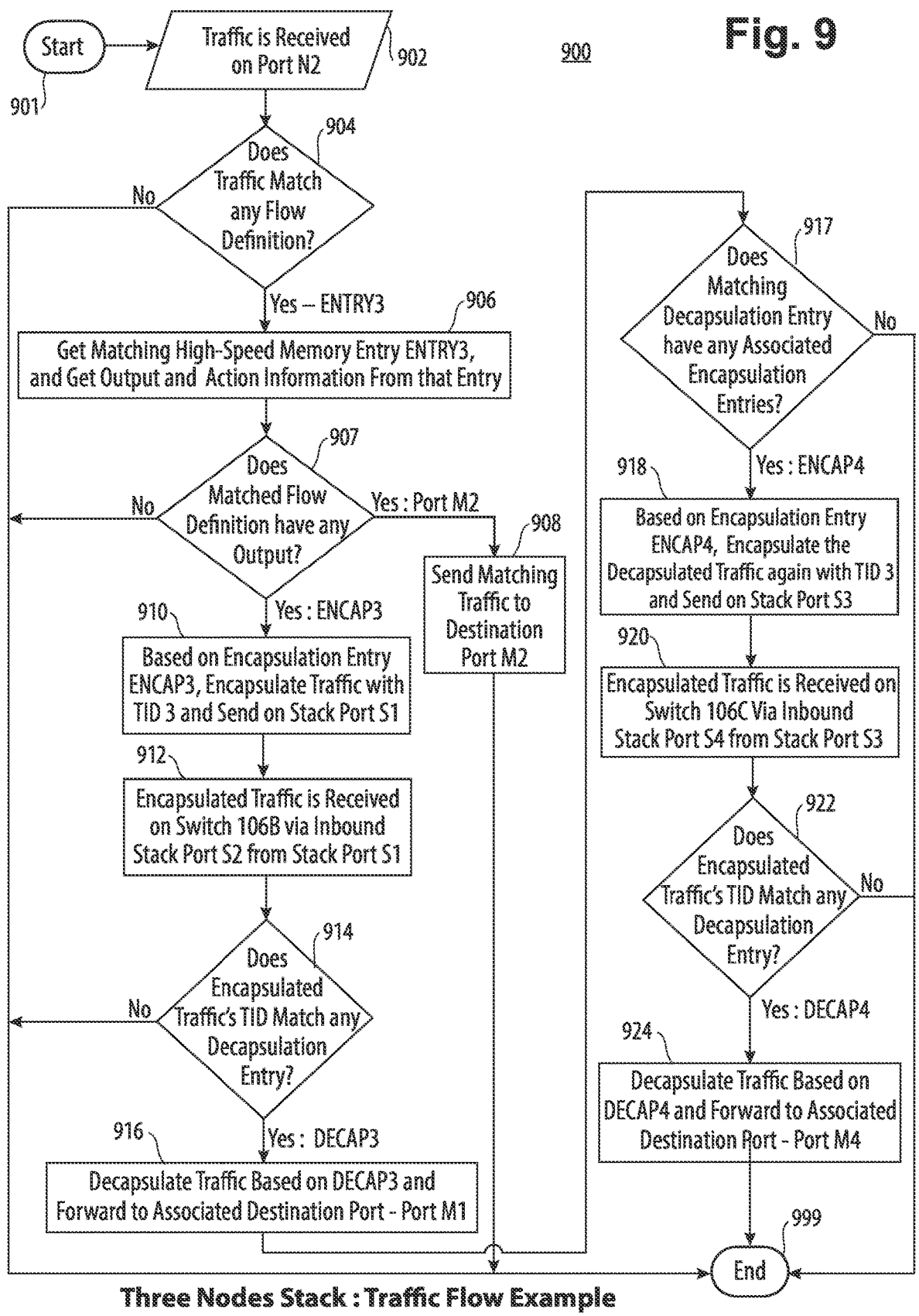
FIG. 9 shows an example traffic flow diagram of the flow of traffic during the operational stage of a stack created configured in FIG. 8 having the topology shown in FIG. 7, in accordance with aspects of the disclosure.

FIG. 7 shows a three-node stack topology with multiple destination ports. FIG. 8 shows flowchart 800 which shows how a flow will be configured in topology shown in FIG. 7. FIG. 9 shows flowchart 900 which shows how network traffic will flow across stack shown in FIG. 7 once map/flow shown in Flowchart 800 is configured. FIG. 7 further augments FIG. 1 and FIG. 4 by adding additional node C and destination ports M4 114D. FIG. 7, FIG. 8 and FIG. 9 augments FIG. 1, FIG. 2 and FIG. 3, respectively to depict how in a three node stack topology, flow configuration and network traffic flow would work if a flow has multiple destinations both on head node and on destination node.

With reference to FIG. 8, flowchart 800 shows a method for configuring a stack, such as stack 104, having three switches with multiple destination ports as shown in FIG. 7. An example is provided that corresponds to the topology 700 shown in FIG. 7, wherein stack 104 includes switches 106A, 106B, and 106C and the destination ports include destination ports M1 114A, M2 114B, M3 114C, and M4 114D.

The method starts at block 801 At block 802, a flow definition and flow mapping are received from a user and stored. For example, the flow definition for third flow F3 specifies a source port for the flow and packet match criteria. In this example, the source port is source port N2 112B and the packet match criteria are provided as a filter FTR3. The flow is formed of network traffic that satisfies the flow definition, determined at least by selecting network traffic that matches filter FTR3. The flow mapping defines one or more destination ports (e.g., destination ports 114 shown in FIG. 7) via which the network traffic associated with the flow will exit the stack. In this example the destination ports are destination ports M1 114A, M2 114B and M4 114D. The flow definition and flow mapping received from the user at block 802 are used to configure the stack to achieve an outcome desired by the user. In this example, the outcome would be all network traffic from source port 112B that matches filter FTR3 (meaning it satisfied criteria specified by the filter) is routed from source port 112B to destination ports M1 114A, M2 114B, and M4 114D.

At block 804, head node (in this example, switch 106A) is configured with a map (also referred to as the flow's map), based on the received flow definition and flow mapping, which defines flow F3. In this example, the map is expressed as: Map3: Port N2→Filter FTR3→Port M1, Port M2, Port M4, wherein N2 refers to source port N2 112B and M1 refers to destination port M1 114A, M2 refers to destination port M2 114B, and M4 refers to destination port M4 114D. Map3 defines flow F3 and configures the head node so that network traffic received at source port N2 112B that matches filter FTR3 of Map3 is sent to destination ports M1 114A, M2 114B, and M4 114D.

Switch 106A maintains a TID database 207 for unique TIDs. At block 806, switch 106A accesses TID database 207 to reserve a unique TID for flow F3, as defined by Map3. This TID is unique across stack 104 and is assigned to flow F3. In the example shown, the TID assigned to F3 and Map3 is TID 3.

In this example, at block 808, the head node (switch 106A) is configured manually or via stack protocol with mapping information that specifies outbound stack ports S1 116A. The outbound stack port(s) are determined (using stack protocol or manually) to reach remote destinations, based on the flow mapping received. In this example, there are multiple remote destinations, namely destination ports 114A, 114B, and 114D.

If there are multiple stack ports between switch 106A and switch 106B, a load balance group of stack ports can be configured using the stack protocol or manually and used that in an encapsulation entry. In this case, stack port S1 116A could be a load balance group of multiple stack ports. The network traffic associated with flow F3 is sent to downstream switch 106B via stack port S1 116A.

At block 810, switch 106A creates an encapsulation entry, in this example ENCAP3. Creation of an encapsulation entry for a flow for a switch refers to configuring the switch to encapsulate a packet using the flow's associated TID and sending the packet to port designated for the flow by the stack protocol. In this example, encapsulation entry ENCAP3 is created to encapsulate packets based on the flow's TID (in this example, TID 3) and send the packet to the outbound stack ports 116 of switch 106A from which the network traffic exits switch 106A (in this example stack port S1 116A.

The flow's TID therefore can be used to access the encapsulation entry and its mapping information. The encapsulation entry in association with the mapping information is expressed as ENCAP3: Port S1, TID 3.

At block 812, switch 106 stores the encapsulation entry ENCAP3 in an entry (ENTRY3) of the high-speed memory (e.g., TCAM) in association with the flow's definition. In this example, flow F3's definition includes flow F3's source port N2 112B and filter FTR3. This high-speed memory entry represents that all network traffic from source port N2 112B that matches filter FTR3 is assigned to encapsulation entry ENCAP3, which expresses the mapping information. The encapsulation entry ENCAP3 is used to assign a TID (in this example, TID 3) to the matched network traffic, encapsulate matched network traffic with the TID (in this example, TID 3) and send the encapsulated matched network traffic to each stack port, in this case the stack port S1 116A. The mapping information is used to send the matched network traffic to each local destination port (if any) of the head node. In this example, local destination port M2 114B is present on the head node switch 106A. In the current example, the high-speed memory entry is expressed as ENTRY3: Port N2→Filter FTR3→Port M2, ENCAP3. The configuration process for the head node ends at block 899.

At block 814, the stack protocol is used to send a configuration to a downstream switch that is the next node on the route established for the flow by the stack protocol. The configuration can be based on the flow's map (in this example, Map3) that defines the flow, including the remaining destination ports by which the network traffic will exit the stack and the flow's TID. This flow's map is associated with TID 3 (as determined in block 806) and identifies remaining destination port(s) M1 114A, and M4 114D as configured by the user in blocks 802 and 804. In this example, there are two destination ports for this switch (one local destination port M1 114A) and one remote destination port (M4 114D)) and one further downstream node associated with Map3 (namely switch 106C), hence the configuration is limited to these destination ports.

At block 816, the downstream switch, which is the next (second) node along the route defined by Map3 and determined by the stack protocol (in this example, switch 106B), is configured by creating a decapsulation entry for flow F3 that can be used by a decapsulation algorithm to decapsulate encapsulated network traffic matching flow F3 received via inbound stack port S2 116B with TID 3. The decapsulation is performed before sending the network traffic matching flow F3 to switch 106B's local destination ports (in this example is destination ports M1 114A) and re-encapsulating the network traffic before transmission to switch 106B's remote destination port (in this example is destination ports M4 114D), as defined by the mapping information. The decapsulation entry includes the flow F3's TID 3 identification, inbound stack ports (in this case, stack port S2 116B which could be configured as a load balance group that includes multiple inbound stack ports) from which network traffic matching flow F3 and having TID 3 is received, and identification of any local destination ports of the downstream switch. Network traffic received at stack port S2 116B encapsulated with TID 3 is to be decapsulated using TID 3 and sent to local destination port M1 114A.

A result is that the downstream switch is configured with mapping information and the flow's TID. The mapping information specifies the inbound stack port S2 116B or load balance group via which encapsulated network traffic matching flow F3 and having TID 3 is received from upstream switch 106A and local destination port M1 114A via which network traffic matching flow F3 exits stack 104. The mapping information further specifies that all destination nodes have not yet been processed, and the method continues at block 817.

At block 817, downstream switch 106B determines outbound stack port(s) (using stack protocol or manually) to reach the remaining remote destination per the flow mapping, namely 114D.

At block 818, downstream switch 106B creates an encapsulation entry, in this example ENCAP4, to re-encapsulate packets based on the flow's TID (in this example, TID 4) and send the packet to the outbound stack port 116 of switch 106B from which the network traffic exits switch 106B (in this example stack port S3 116C) to a further downstream switch, switch 106C. The encapsulation entry in association with the mapping information is expressed as ENCAP4: Port S3, TID 3.

At block 820, the downstream switch 106B creates a decapsulation entry to decapsulate encapsulated network traffic matching flow F3 received via inbound stack port S2 116B (which could be configured as a load balance group that includes multiple inbound stack ports) with TID 3. The decapsulation is performed before sending the network traffic matching flow F3 to switch 106C's local destination ports (in this example is destination port M1 114A) and before re-encapsulating the network traffic using ENCAP4. The decapsulation entry includes the flow F3's TID 3 identification, inbound stack port S2 116B, identification of any local destination ports of the further downstream switch 106C, and encapsulation entry ENCAP4. The decapsulation entry is expressed as: DECAP3: TID 3, Port S2→Port M1, ENCAP4.

At block 822, downstream switch 106B (using the stack protocol or manually) sends a configuration to the further downstream switch 106C. The configuration is based on the flow's map and includes the flow's TID and the remaining destination port designated for the network traffic to exit the stack. Accordingly, further downstream switch 106C is configured with Map3, TID 3, and remaining destination port M4 116D, which is a local destination port. Further downstream switch 106C is not figured with any further remote destination ports.

At block 824, further downstream switch 106C is configured with the configuration provided by downstream switch 106B, namely with Map3, TID 3, the remaining destination port, M4 116D. Further downstream switch 106C uses the configuration to create a decapsulation entry, which is expressed as: DECAP4: TID 3, Port S4→Port M4.

The method ends at block 899, and this concludes implementation of the user configuration received in blocks 802 and 804 across stack 104.

FIG. 9 shows a traffic flow diagram 900 of network traffic flow during the operational stage in a stack that has already been configured for flow F3 to flow through three switches (106A, 106B, and 106C) to multiple destination ports (destination ports M1 114A, M2 114B, and M4 114D).

The method starts at block 901. At block 902, network traffic is received at the source port, (in this example source port 112B of switch 106A) that is physically connected to an external network (in this example, via port 120B). The switch (in this example, switch 106A) receiving the network traffic has been configured as the head node for flow F3. At block 904, a determination is made whether the network traffic matches any flow definitions (including associated filters) of any high-speed memory entries stored by the head node (e.g., switch 106A).

If the determination at block 904 is NO, that is the network traffic does not match any flow definitions of the high-speed memory entries, the method ends at block 999. Else, if the determination at block 904 is YES, that is the network traffic does match a flow definition of one of the high-speed memory entries, the method continues at block 906.

At block 906, the high-speed memory entry having the matching flow definition (including its filter (in this example, FTR3)) is selected. This selected traffic becomes a flow, which in this example is flow F3. It is noted, as described with respect to block 812 of FIG. 8, the selected high-speed memory entry is associated with the flow's encapsulation entry (in this example, ENCAP3). Output and/or action information can be obtained from the selected high-speed memory entry. In this example, the output and/or action information includes mapping information and the flow's encapsulation entry ENCAP3.

At block 907, a determination is made whether action and output information (meaning an encapsulation entry and mapping information) were successfully obtained at block 906. If action and output information were not available to be obtained, the method ends at block 999. If the action and output information were successfully obtained, the method continues at block 908.

At block 908, the flow's network traffic is forwarded to any of the switch's local destination port. In this example, the switch has a local destination port M2 114B and the flow's network traffic is forwarded to destination port M2 114B. Network traffic is received on device port 130B via datalink 154B.

At block 910, the network traffic is encapsulated based on encapsulation entry ENCAP3 using TID associated with the encapsulation entry, in this case TID 3 and sent to the stack port or load balance group of multiple stack ports associated with the encapsulation entry, in this case to stack port S1 116A as configured in block 810.

At block 912, the encapsulated network traffic assigned to the flow (also referred to as "the flow") is received at the downstream switch in the stack associated with the next hop via an inbound stack port or load balance group of multiple stack ports. In this example, the flow F3 is received at switch 106B via inbound stack port S2 116B, as shown in FIG. 7. The downstream switch that received the encapsulated network traffic (in this example switch 106B) becomes the current switch.

At block 914, a determination is made by the current switch (in this example switch 106B) whether the received network traffic's TID matches a TID included with any of the decapsulation entries created for the current switch during configuration described in flowchart 800 of FIG. 8. If it is determined at block 914 that the flow's TID matches a decapsulation entry, the method continues at block 916, else the method ends at block 999, meaning the network traffic is ignored. In this case network traffic's TID 3 matches decapsulation entry DECAP3.

At block 916, the current switch (switch 106B) retrieves the mapping information associated with the decapsulation entry that was successful (as stored at block 820 of FIG. 8). The TID and mapping information can be used for future encapsulation and transmission of the flow to further downstream switches and local destination ports, if any. In this case, the flow's network traffic is decapsulated and forwarded to the next port based on the mapping information associated with DECAP3. As shown in FIG. 7 and block 820 of FIG. 8, the next port based on DECAP3 is M1 114A of switch 106B. Encapsulated network traffic received via stack ports S2 116B is decapsulated based on DECAP3 and sent out of switch 106B from port M1 114A (determined from DECAP3). Decapsulated network traffic is received on device port 130A via datalink 154A.

At block 917, a determination is made at the current switch (switch 106B) whether decapsulation entry DECAP3 has any associated encapsulation entries. If the determination is that decapsulation entry DECAP3 does not have any associated encapsulation entries, the method ends at block 999. If the decapsulation entry DECAP3 does have any associated encapsulation entry, the method continues at block 918. In this case the decapsulation entry DECAP3 has associated encapsulation entry ENCAP4.

At block 918, the current switch (switch 106B) re-encapsulates the decapsulated traffic with TID 3 based on encapsulation entry ENCAP4 and sends the traffic via outbound stack port S3 116C to a further downstream switch (switch 106C).

At block 920, the encapsulated network traffic assigned to flow F3 is received at the further downstream switch 106C via inbound stack port S4 116D, as shown in FIG. 7. The further downstream switch 106C becomes the current switch.

At block 922, a determination is made by the current switch (in this example switch 106C) whether the received network traffic's TID matches TID included with any of the decapsulation entries created for the current switch during configuration described in flowchart 800 of FIG. 8. If it is determined at block 922 that the flow's TID matches a decapsulation entry, the method continues at block 924, else the method ends at block 999, meaning the network traffic is ignored. In this case network traffic's TID 3 matches decapsulation entry DECAP4.

At block 924, the current switch (switch 106C) retrieves the mapping information associated with the decapsulation entry that was successful (as stored at block 824 of FIG. 8). In this case, the flow's network traffic is decapsulated and forwarded to the next port based on the mapping information associated with DECAP4. As shown in FIG. 7 and block 824 of FIG. 8, the next port based on DECAP4 is M4 114D of switch 106C. Encapsulated network traffic received via stack ports S4 116D is decapsulated based on DECAP4 and sent out of switch 106C from port M4 114D (determined from DECAP4). The decapsulated network traffic is received on device port 130D via datalink 154D. Since DECAP4 does not include an encapsulation entry, the method ends at block 999.

This concludes stack configuration and network traffic flow across the stack for a three-node stack topology with one source port and multiple destination ports as shown in FIG. 7.

Figure 10A:
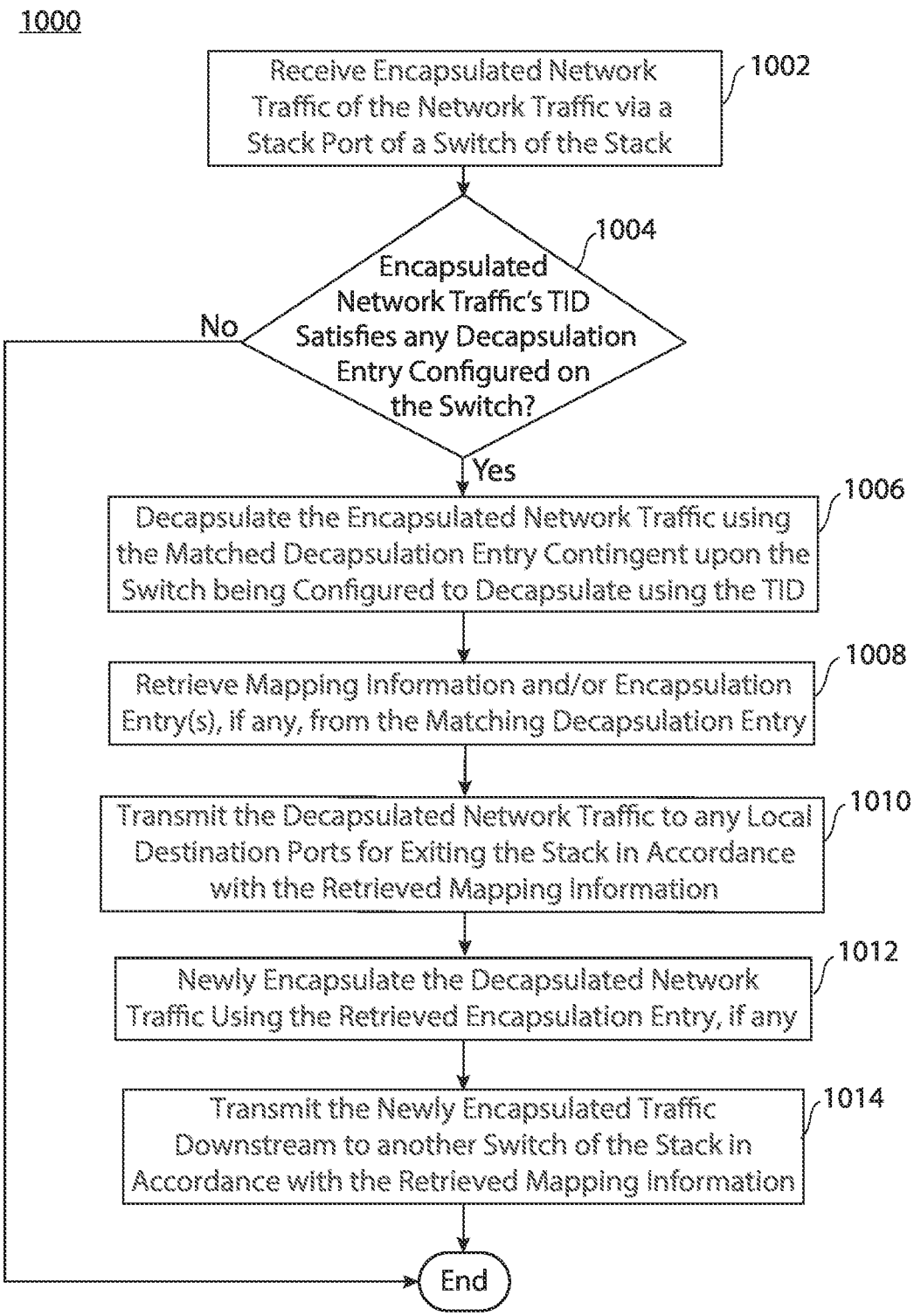
FIG. 10A shows a flowchart of an example method of operation of a downstream switch of a switch of a stack in accordance with aspects of the disclosure.
Figure 10B:
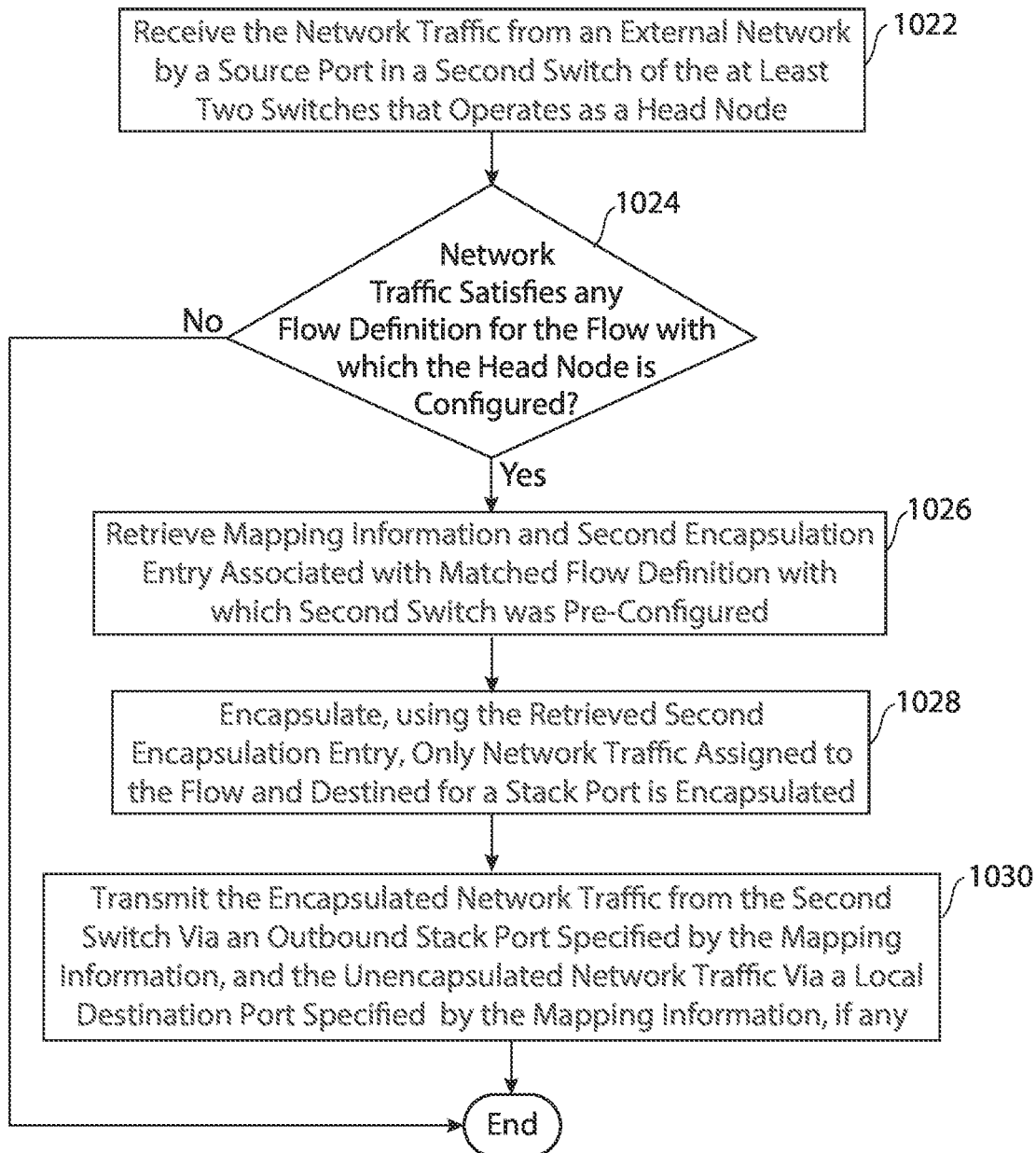
FIG. 10B shows a flowchart of an example method of operation of a switch operating as a head node of a stack, in accordance with aspects of the disclosure.

With reference to FIGS. 10A and 10B, an example method of operation of switches of a stack, such as switches 106 of stack 104 shown in FIG. 1, are shown. FIG. 10A shows a flowchart 1000 of an example method of operation of a downstream switch, such as switch 106B or 106C shown in FIG. 1 and FIG. 7. At block 1002, encapsulated network traffic is received from an upstream switch of the stack. The encapsulated network traffic is received by the downstream switch via an inbound stack port of the downstream switch. The encapsulated network traffic was encapsulated with a flow identification (TID), wherein the TID is assigned to a particular flow and is unique across the stack. The encapsulated network traffic can be received via the inbound stack port using internet protocol or a physical connection. The inbound stack port can include two or more stack ports which can use internet protocol and/or a physical connection.

At block 1004, a determination is made whether the encapsulated network traffic's TID matches any decapsulation entries with which the downstream switch has been preconfigured. If a matching decapsulation entry is found (meaning having the same TID), the method continues at block 1006, else the method ends (meaning the downstream switch was not configured to decapsulate the encapsulated network traffic, and the encapsulated network traffic is ignored by the downstream switch).

At block 1006, the encapsulated network traffic is decapsulated using the matching decapsulation entry, including applying a decapsulation algorithm.

At block 1008, the downstream switch retrieves from the matching decapsulation entry mapping information and/or one or more encapsulation entries, if any, with which the downstream switch was preconfigured. It is understood that block 1008 includes making a determination whether there are any encapsulation entries. The number of encapsulation entries stored in association with any decapsulation entry can be determined by the number of unique TID and outbound stack port combinations to reach multiple downstream destinations, which can be determined by stack protocol or configured by the user per user discretion.

At block 1010, the decapsulated network traffic is transmitted to any local destination port(s) of the downstream switch specified in the mapping information associated with the matching decapsulation entry. The decapsulated network traffic thus exits the stack via its local destination port(s). It is understood that block 1010 includes making a determination whether there are any local destination port(s).

At block 1012, if mapping information associated with the matching decapsulation entry with which the switch is preconfigured indicates that the network traffic is to be transmitted further downstream to one or more other switches in the stack, the decapsulated network traffic is newly encapsulated using the TID associated with the retrieved encapsulation entry(s).

At block 1014, the newly encapsulated network traffic is transmitted via at least one outbound stack port of the downstream switch to at least one inbound stack port of one or more other switches that are further downstream, wherein the outbound stack port of the switch is included with the mapping information associated with the encapsulation entry.

There is no need to specify the inbound stack port of the one or more other switches that are further downstream. The flow will automatically flow to the inbound stack port if it is physical connected to the downstream switch's output stack port specified. If an IP link connects the downstream switch's output stack port and any inbound stack port of the one or more other switches, then IP protocol will manage sending the packet to the inbound stack port.

FIG. 10B shows a flowchart 1020 of an example method of operation of a second switch operating as a head node of the stack, such as switch 106A shown in FIG. 1. At block 1022, the second switch receives the network traffic from an external network in a source port. At block 1024, a determination is made by the second switch whether the network traffic satisfies a flow definition for the flow, wherein the second switch is configured with the flow definition. More particularly, in the example embodiment shown, a determination is made whether an entry stored in a preconfigured high-speed memory matches a flow definition (e.g., a user-defined tuple) of the received network traffic. The high-speed memory uses a filter to determine whether there is a matching entry. If a matching entry is found, the method continues at block 1026. If a matching entry is not found the method ends, meaning the received network traffic is ignored by the second switch.

At block 1026, the method includes retrieving mapping information and second encapsulation entry(s) that are associated with a matching flow definition with which the second switch was pre-configured. In particular, the mapping information and second encapsulation entry(s) are retrieved from an entry stored in high-speed memory that matches the flow's flow definition with which second switch was pre-configured.

At block 1028, second switch encapsulates, using the TID associated with the second encapsulation entry(s) and an encapsulation algorithm, only network traffic of the received network traffic assigned to the flow and destined for a stack port. At block 1030, second switch transmits the encapsulated network traffic from the second switch via one or more outbound stack ports specified by the retrieved encapsulation entry's mapping information. The encapsulated network traffic is transmitted from the second switch to the remote inbound stack port of one or more downstream switches. In addition, received network traffic which satisfies the flow definition (as determined in block 1024) is also sent out of local destination port(s), if mapping information specifies any local destination port(s). This network traffic is sent as is, no encapsulation is done on this network traffic flow being sent out on local destination port(s). It is understood that block 1028 includes making a determination whether there are any local destination ports.

Figure 11A:
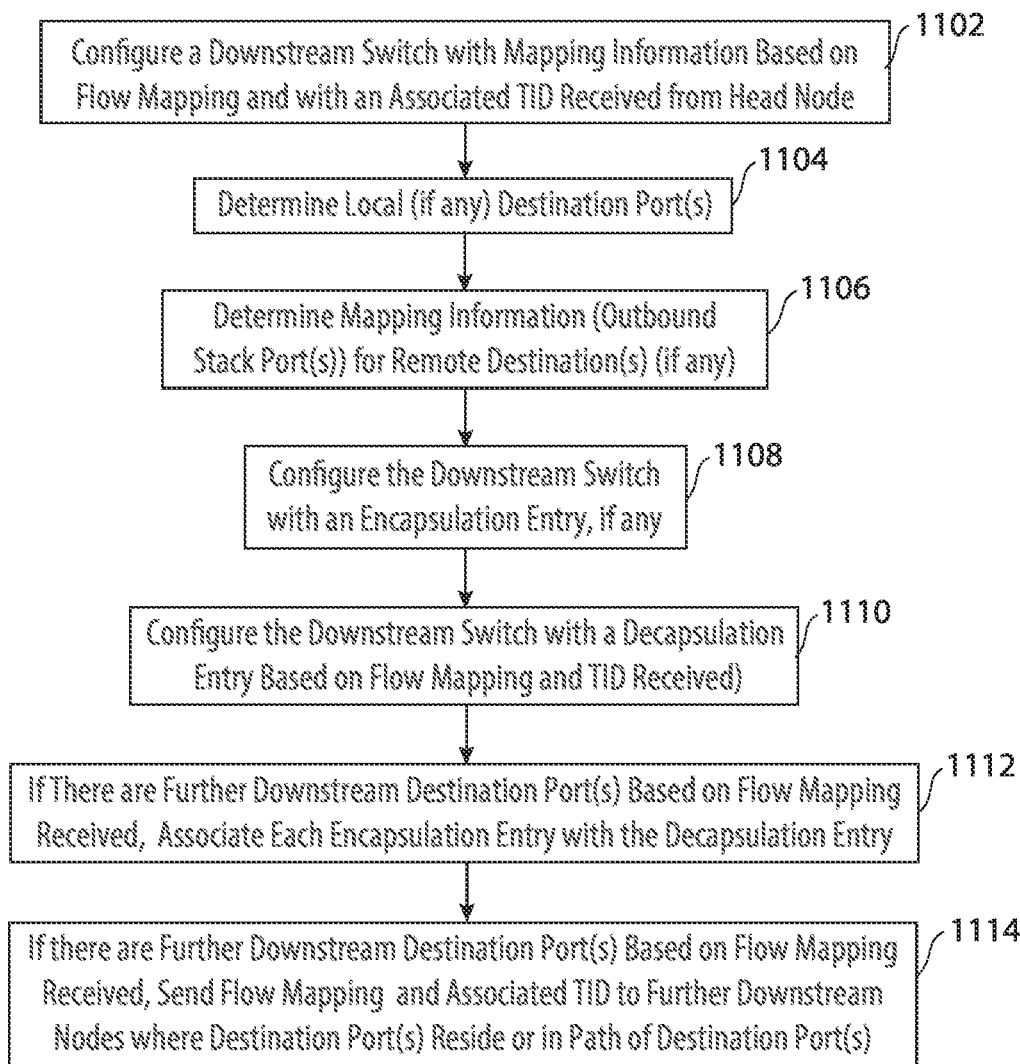
FIG. 11A shows a flowchart of an example method of configuration of a downstream switch of a stack, in accordance with aspects of the disclosure.

FIG. 11A shows a flowchart 1100 of an example method of configuration for a flow of a downstream switch, such as switch 106B or 106C shown in FIGS. 1, 4, and 7. The switch can be configured with additional flows, such as by using the example method shown. At block 1102, the downstream switch receives a flow mapping for a flow. The flow mapping defines one or more destination ports for the flow to exit the stack. The downstream switch is also configured with the TID assigned to the flow by the head node. The flow mapping, which was received from the user, can include local and/or remote destination ports. Configuration can be performed manually or using a stacking protocol, including each block of flowcharts 1100 and 1120.

At block 1104, mapping information is determined to include each of the one or more local destination ports (if any) via which the flow can exit the stack via the downstream switch. It is understood that block 1104 includes making a determination whether the mapping information includes any local destination ports.

At block 1106, mapping information is determined for one or more remote destination ports (if any), wherein the mapping information includes an outbound stack port for each remote destination port via which the flow can be transmitted from the downstream switch to a further downstream switch. It is understood that block 1106 includes making a determination whether the mapping information includes any remote destinations.

At block 1108, the downstream switch, is further configured to include encapsulation entry(s) if the mapping information has remote destination port(s). Each encapsulation entry is configured to encapsulate the decapsulated network traffic of the flow prior to the downstream switch transmitting the encapsulated network traffic to a further downstream switch via an outbound stack port of the switch, if any. Each encapsulation entry is configured based on the associated TID received for the flow and a corresponding outbound stack port as determined at block 1106.

At block 1110, the downstream switch, is further configured with a decapsulation entry based on the flow mapping and associated TID received for the flow. The decapsulation entry is configured to use the flow's TID to decapsulate encapsulated network traffic of the flow received from an upstream switch of the stack and send decapsulated network traffic to any local destination port(s) as configured by the user per the flow mapping.

At block 1112, if there are further downstream destination port(s) based on the flow mapping received for the flow, each corresponding encapsulation entry (created in step 1108) is associated with the decapsulation entry (created in step 1110). In this way, during operation, the encapsulation entry(s) can be accessed via the decapsulation entry. During operation, the encapsulation entry(s) are used to encapsulate, using the flow's TID, decapsulated network traffic received from an upstream switch of the stack and to send the encapsulated network traffic to one or more further downstream switches via one or more outbound stack ports of the downstream switch. The encapsulated network traffic is ultimately sent to one or more remote destinations ports based on the flow mapping received from the user for the flow.

At block 1114, if there are further downstream destination port(s) based on the flow mapping received, the flow mapping and associated TID are sent to the further downstream node(s) where destination port(s) reside or that are in a path of the destination port(s). In this way, any further downstream nodes can be configured using the example method for configuring the switch.

Figure 11B:
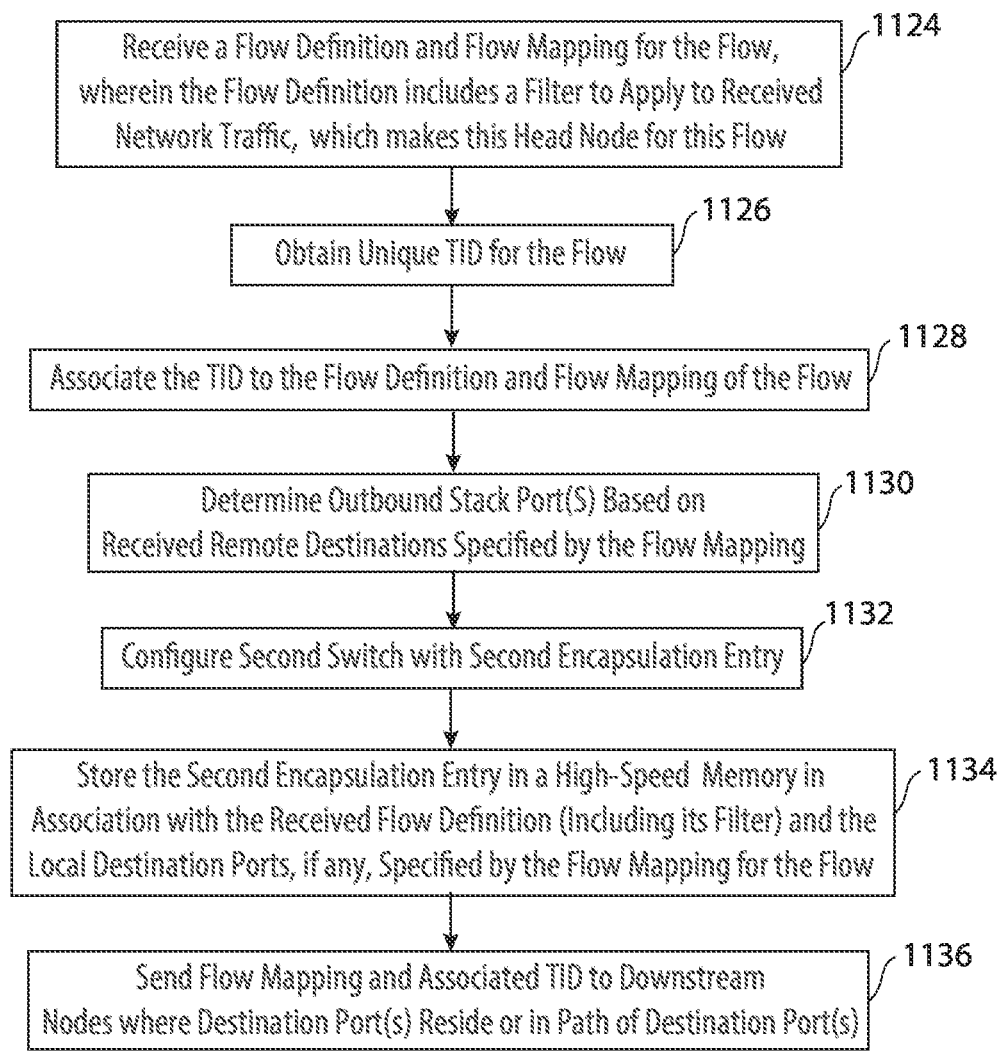
FIG. 11B shows a flowchart of an example method of configuring a switch operating as a head node of the stack, in accordance with aspects of the disclosure.

FIG. 11B shows a flowchart of an example method of configuring a second switch operating as a head node of the stack, such as switch 106A shown in FIG. 1. At block 1124, a flow definition and the flow mapping for the flow are received, wherein the flow definition includes a filter to apply to the network traffic received by the second switch so that only network traffic that satisfies the flow definition, based at least on the network traffic matching the filter, is assigned to the flow.

At block 1126, a unique TID is obtained for the flow. At block 1128, the TID is associated to the flow definition and flow mapping of the flow. At block 1130, one or more outbound stack ports of the second switch for transmission of the flow via the switch to a downstream switch is determined. This configuration of the second switch is configured based on remote destinations specified by the flow mapping received for the flow. Configuring the second switch can include determining mapping information associated with the TID, wherein the mapping information indicates the outbound stack port(s) of the downstream switch for transmission of the flow via the downstream switch to a further downstream switch.

At block 1132, the second switch is configured to include one or more second encapsulation entry(s) that correspond to the flow. The second encapsulation entry(s) are configured to use the TID (determined in block 1126) to encapsulate received network traffic of the flow prior to the second switch transmitting the encapsulated network traffic via the one or more outbound stack ports (determined in block 1130) of the second switch.

In one or more embodiments, at block 1134, the second encapsulation entry(s) are stored in a high-speed memory in association with the received flow definition and the flow mapping for the flow. The second encapsulation entry is thus available only for packets of network traffic that pass the filter (meaning the packets satisfy the flow definition), indicating they belong to the flow. Any local destination ports specified by the flow mapping for the flow are also stored in the high-speed memory in association with the flow definition.

At block 1136, the flow mapping and associated TID are sent to downstream nodes where destination port(s) reside or that are in a path of the destination port(s).

In one or more embodiments, the network traffic that satisfies the flow definition is transmitted to the one or more local destination ports of the second switch or downstream switch prior to encapsulation by the encapsulation algorithm.

In one or more embodiments, the downstream switch includes an inbound stack port via which the switch receives the encapsulated network traffic and the upstream switch includes an outbound stack port via which the upstream switch transmits the encapsulated network traffic. The method can further include assigning an internet protocol address to each of the inbound stack port and the outbound stack port.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the switches 106 may be implemented or executed by one or more computer systems. For example, switches 106 can be implemented using a computer system such as example computer system 1200 illustrated in FIG. 12. In various embodiments, computer system 1200 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 1200 is only one example of a suitable system and is not intended to suggest any limitation as to the scope of use or functionality of embodiments of the disclosure described herein. Regardless, computer system 1200 is capable of being implemented and/or performing any of the functionality set forth hereinabove.

Computer system 1200 may be described in the general context of computer system-executable instructions, such as program modules, being executed by a computer system. Generally, program modules may include routines, programs, objects, components, logic, data structures, and so on that perform particular tasks or implement particular abstract data types. Computer system 1200 may be practiced in distributed data processing environments where tasks are performed by remote processing devices that are linked through a communications network. In a distributed data processing environment, program modules may be located in both local and remote computer system storage media including memory storage devices.

Figure 12:
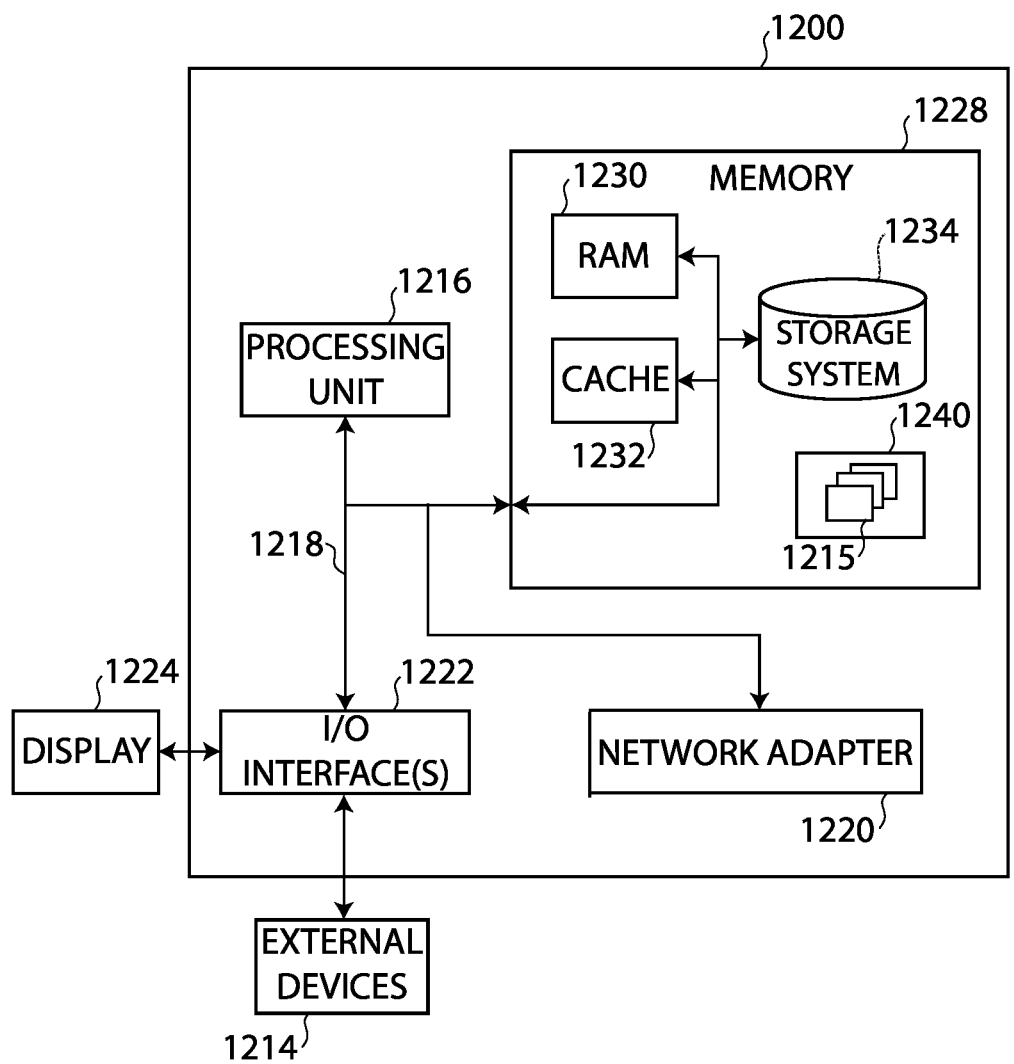
FIG. 12 illustrates an example computing system of a switch of a stack to implement a network system.

Computer system 1200 is shown in FIG. 12 in the form of a general-purpose computing device. The components of computer system 1200 may include, but are not limited to, one or more processors or processing units 1216, a system memory 1228, and a bus 1218 that couples various system components including system memory 1228 to processor 1216.

Bus 1218 represents one or more of any of several types of bus structures, for example and without limitation, a memory bus or memory controller. Computer system 1200 typically includes a variety of computer system readable media. Such media may be any available media that is accessible by computer system 1200, and it includes both volatile and non-volatile media, removable and non-removable media.

System memory 1228 can include computer system readable media in the form of volatile memory, such as random access memory (RAM) 1230 and/or cache memory 1232. Computer system 1200 may further include other removable/non-removable, volatile/non-volatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 1218 by one or more data media interfaces. As will be further depicted and described below, memory 1228 may include at least one program product having a set (e.g., at least one) of program modules that are configured to carry out the functions of embodiments of the disclosure.

Program/utility 1240, having a set (at least one) of program modules 1215, such as computer system 1200, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1215 generally carry out the functions and/or methodologies of embodiments of the disclosure as described herein.

Computer system 1200 may also communicate with one or more external devices 1214 such as a keyboard, a pointing device, a display 1224, etc.; one or more devices that enable a user to interact with computer system 1200; and/or any devices (e.g., network card, modem, etc.) that enable switches 126 to communicate with one or more other computing devices. Such communication can occur via Input/Output (I/O) interfaces 1222. Still yet, computer system 1200 can communicate with one or more networks such as a local area network (LAN), a general wide area network (WAN), and/or a public network (e.g., the Internet) via network adapter 1220. As depicted, network adapter 1220 communicates with the other components of network management server 124 via bus 1218. It should be understood that although not shown, other hardware and/or software components could be used in conjunction with computer system 1200. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method of configuring a stack having at least two switches, the method comprising:
   configuring a switch of the at least two switches with mapping information based on a user input flow definition and flow mapping for a flow, wherein the flow definition includes user configurable rules to identify the flow, wherein the flow mapping defines one or more destination ports having one or more local destination ports and/or one or more remote destination ports for the flow to exit the stack, and wherein the mapping information includes the one or more local destination ports, via which the flow can exit the stack from the switch, and an outbound stack port for each of the one or more remote destination ports, via which the flow can be transmitted from the switch to a downstream switch;
   creating a decapsulation entry that corresponds to the flow, the decapsulation entry having an associated flow identification (ID) for the flow, wherein the flow ID is assigned to the flow and is unique across the stack;
   configuring the switch with access to a decapsulation algorithm, the decapsulation algorithm being configured to use the flow ID via the decapsulation entry to decapsulate encapsulated network traffic of the flow received from an upstream switch of the at least two switches, wherein the at least two switches further include at least one downstream switch that is downstream from the switch;

creating an encapsulation entry that corresponds to the flow, the encapsulation entry having the flow ID for the flow;

configuring the switch with access to an encapsulation algorithm, the encapsulation algorithm being configured to use the flow ID via the encapsulation entry to encapsulate the decapsulated network traffic of the flow prior to the switch transmitting the encapsulated network traffic to the at least one downstream switch; and storing the flow definition and the flow mapping in a high-speed memory, wherein the second encapsulation entry, the flow definition, and the flow mapping are stored in association with one another, and wherein the mapping information further includes one or more second local destination ports that are local to the second switch.

2. The method of claim 1, wherein the one or more destination ports includes one or more local destination ports, the method further comprising associating the one or more local destination ports with the decapsulation entry.

3. The method of claim 1, further comprising, associating the encapsulation entry with the decapsulation entry.

4. The method of claim 1, wherein the at least two switches include at least one downstream switch that is downstream from the switch, the method further comprising providing the flow mapping and associated flow ID to the at least one downstream node for configuration of the at least one downstream node.

5. The method of claim 1, wherein the switch includes an inbound stack port via which the switch receives the encapsulated network traffic and the upstream switch includes an outbound stack port via which the upstream switch transmits the encapsulated network traffic, and wherein the method further comprises assigning an internet protocol address to each of the inbound stack port and the outbound stack port.

6. The method of claim 1, wherein the encapsulated network traffic is received from the upstream switch via a physical connection between an inbound stack port of the switch and an outbound stack port of the upstream switch.

7. The method of claim 1, wherein the encapsulated network traffic from the upstream switch is received from two or more outbound stack ports via two or more inbound stack ports of the switch, wherein the two or more outbound stack ports are configured as a load balance group and/or the two or more inbound stack ports are configured as a load balance group.

8. A stack having at least two switches for transmitting network traffic through the stack, each switch comprising:

a memory configured to store instructions;

processor disposed in communication with said memory, wherein the processor associated with a switch of the at least two switches upon execution of the instructions is configured to:

configure a switch of the at least two switches with mapping information based on a user input flow definition and flow mapping for a flow, wherein the flow definition includes user configurable rules to identify the flow, wherein the flow mapping defines one or more destination ports having one or more local destination ports and/or one or more remote destination ports for the flow to exit the stack, and wherein the mapping information includes the one or more local destination ports, via which the flow can exit the stack from the switch, and an outbound stack port for each of the one or more remote destination ports, via which the flow can be transmitted from the switch to a downstream switch;

create a decapsulation entry that corresponds to the flow, the decapsulation entry having an associated flow identification (ID) for the flow, wherein the flow ID is assigned to the flow and is unique across the stack;

configure the switch with access to a decapsulation algorithm, the decapsulation algorithm being configured to use the flow ID via the decapsulation entry to decapsulate encapsulated network traffic of the flow received from an upstream switch of the at least two switches, wherein the at least two switches further include at least one downstream switch that is downstream from the switch, create an encapsulation entry that corresponds to the flow, the encapsulation entry having the flow ID for the flow and configure the switch with access to an encapsulation algorithm, the encapsulation algorithm being configured to use the flow ID via the encapsulation entry to encapsulate the decapsulated network traffic of the flow prior to the switch transmitting the encapsulated network traffic to the at least one downstream switch; and store the flow definition and the flow mapping in a high-speed memory, wherein the second encapsulation entry, the flow definition, and the flow mapping are stored in association with one another, and wherein the mapping information further includes one or more second local destination ports that are local to the second switch.

9. The stack of claim 8, wherein the one or more destination ports includes one or more local destination ports, and the wherein the processor associated with the switch upon execution of the instructions is further configured to associate the one or more local destination ports with the decapsulation entry.

10. The stack of claim 8, wherein the processor associated with the switch upon execution of the instructions is further configured to associate the encapsulation entry with the decapsulation entry.

11. The stack of claim 8, wherein the at least two switches include at least one downstream switch that is downstream from the switch, and the processor associated with the switch upon execution of the instructions is further configured to provide the flow mapping and associated flow ID to the at least one downstream node for configuration of the at least one downstream node.

12. The stack of claim 8, wherein a processor associated with a second switch of the at least two switches upon execution of the instructions is configured to:

receive a flow definition and the flow mapping for the flow, wherein the flow definition includes a filter to apply to received network traffic so that only network traffic that satisfies the flow definition, based at least on the network traffic matching the filter, is assigned to the flow;

obtain the flow ID for the flow;

associate the flow ID to the flow definition and the flow mapping of the flow;

store the mapping information associated with the flow ID based on the flow's flow mapping, the mapping information indicating one or more outbound stack ports of the second switch for transmission of the flow through the stack ultimately to the one or more remote destination ports;

create a second encapsulation entry that corresponds to the flow, the second encapsulation entry having the flow ID for the flow;

store the second encapsulation entry in a high-speed memory in association with the flow definition; and access an encapsulation algorithm, the encapsulation algorithm being configured to use the flow ID via the second encapsulation entry to encapsulate received network traffic of the flow prior to the second switch transmitting the encapsulated network traffic via the one or more outbound stack ports of the second switch.

13. The stack of claim 8, wherein the switch includes an inbound stack port via which the switch receives the encapsulated network traffic and the upstream switch includes an outbound stack port via which the upstream switch transmits the encapsulated network traffic, and wherein the processor associated with the switch upon execution of the instructions is further configured to assign an internet protocol address to each of the inbound stack port and the outbound stack port.

14. The stack of claim 8, wherein the encapsulated network traffic is received from the upstream switch via a physical connection between an inbound stack port of the switch and an outbound stack port of the upstream switch.

15. The stack of claim 8, wherein the encapsulated network traffic from the upstream switch is received from two or more outbound stack ports via two or more inbound stack ports of the switch, wherein the two or more outbound stack ports are configured as a load balance group and/or the two or more inbound stack ports are configured as a load balance group.

16. A method of configuring a stack having at least two switches, the method comprising:

configuring a switch of the at least two switches with mapping information based on a user input flow mapping for a flow, wherein the flow mapping defines one or more destination ports having one or more local destination ports and/or one or more remote destination ports for the flow to exit the stack, and wherein the mapping information includes the one or more local destination ports, via which the flow can exit the stack from the switch, and an outbound stack port for each of the one or more remote destination ports, via which the flow can be transmitted from the switch to a downstream switch;

creating a decapsulation entry that corresponds to the flow, the decapsulation entry having an associated flow identification (ID) for the flow, wherein the flow ID is assigned to the flow and is unique across the stack;

creating an encapsulation entry that corresponds to the flow, the encapsulation entry having the flow ID for the flow, wherein the at least two switches further include at least one downstream switch that is downstream from the switch;

configuring the switch with access to a decapsulation algorithm and an encapsulation algorithm, the decapsulation algorithm being configured to use the flow ID via the decapsulation entry to decapsulate encapsulated network traffic of the flow received from an upstream switch of the at least two switches, the encapsulation algorithm being configured to use the flow ID via the encapsulation entry to encapsulate the decapsulated network traffic of the flow prior to the switch transmitting the encapsulated network traffic to the at least one downstream switch; and configuring a second switch of the at least two switches as a head node of the stack for the flow, comprising configuring the second switch for:

receiving a flow definition and the flow mapping for the flow, wherein the flow definition includes a filter to apply to received network traffic so that only network traffic that satisfies the flow definition, based at least on the network traffic matching the filter, is assigned to the flow;

obtaining the flow ID for the flow;

associating the flow ID to the flow definition and the flow mapping of the flow;

storing the mapping information associated with the flow ID based on the flow's flow mapping, the mapping information indicating one or more outbound stack ports of the second switch for transmission of the flow through the stack ultimately to the one or more remote destination ports;

creating a second encapsulation entry that corresponds to the flow, the second encapsulation entry having the flow ID for the flow;

storing the second encapsulation entry in a high-speed memory in association with the flow definition; and accessing an encapsulation algorithm, the encapsulation algorithm being configured to use the flow ID via the second encapsulation entry to encapsulate received network traffic of the flow prior to the second switch transmitting the encapsulated network traffic via the one or more outbound stack ports of the second switch.

* * * * *